United States Patent [19]

Kohashi

[11] 4,419,663
[45] Dec. 6, 1983

[54] DISPLAY DEVICE

[75] Inventor: Tadao Kohashi, Moriguchi, Japan

[73] Assignee: Matsushita Electric Industrial Co., Ltd., Kadoma, Japan

[21] Appl. No.: 128,039

[22] Filed: Mar. 7, 1980

[30] Foreign Application Priority Data

Mar. 14, 1979 [JP] Japan .................................. 54-30363
Mar. 14, 1979 [JP] Japan .................................. 54-30364
Nov. 7, 1979 [JP] Japan .................................. 54-144617

[51] Int. Cl.$^3$ ............................................. G09G 3/34
[52] U.S. Cl. .................................... 340/783; 340/763;
340/788; 52/171; 350/355; 350/359; 350/363;
350/162.11
[58] Field of Search ............... 350/355, 356, 359, 362,
350/363, 106, 162, 319, 258, 259; 52/171;
340/763, 764, 783, 787, 788

[56] References Cited

U.S. PATENT DOCUMENTS 1,744,642 1/1930 Kondo ............................ 350/162 R
3,476,460 11/1969 Hansen et al. ...................... 350/359
4,199,228 4/1980 Destannes ........................... 350/363
4,269,480 5/1981 Krueger ............................. 350/355

FOREIGN PATENT DOCUMENTS 2002854 7/1971 Fed. Rep. of Germany ........ 52/171

Primary Examiner—Marshall M. Curtis
Attorney, Agent, or Firm—Amster, Rothstein & Engelberg

[57] ABSTRACT

A display device comprises a composite body including a display structure of film-shape or plate-shape porous substance made of light transmissive or colored dielectric material and supported to expose at least one surface thereof to an open space and light transmissive liquid material impregnated in the porous substance, and means for applying a signal voltage to the composite body. By electroosmotic movement of the light transmissive liquid material in the porous substance in response to the signal voltage, liquid impregnation factor on at least one surface of the porous substance exposed to the open space is electrically controlled to control light reflection factor or light transmission factor of the composite body to an external light.

By forming a plurality of depressions of dot or line shape on the surface of the porous substance exposed to the open space, a high sensitivity control of external light is attained. By applying color ink on the surface of the porous substance or a surface of a support plate for supporting the porous substance, a color display device is attained.

115 Claims, 31 Drawing Figures

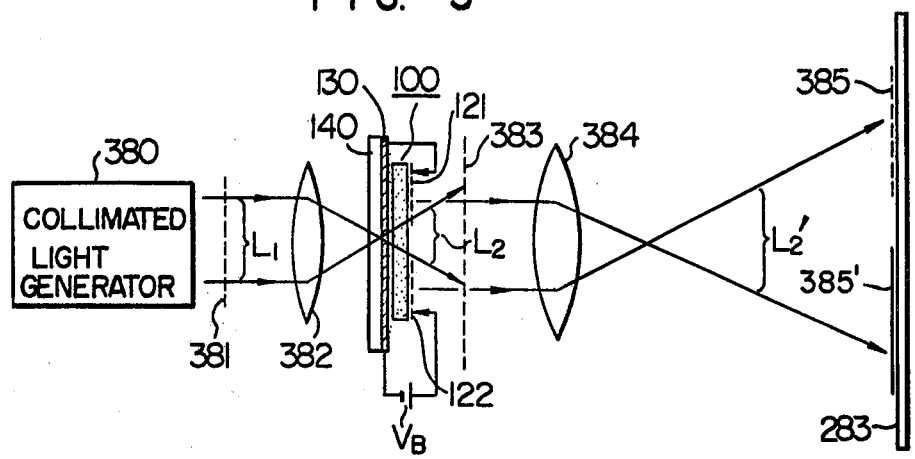
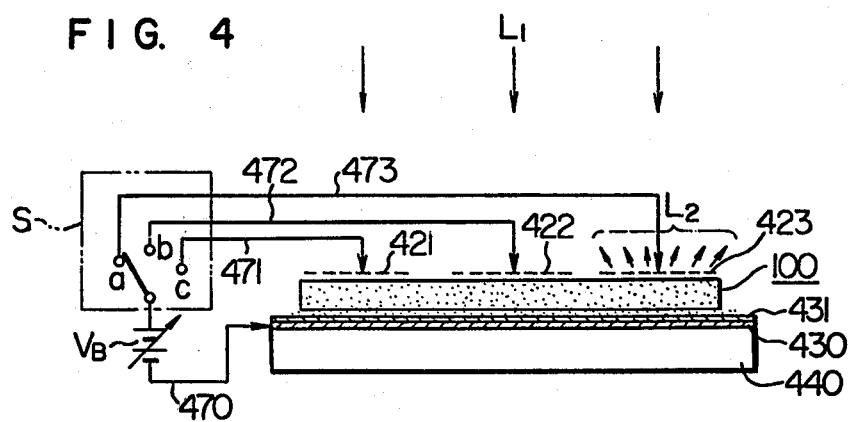
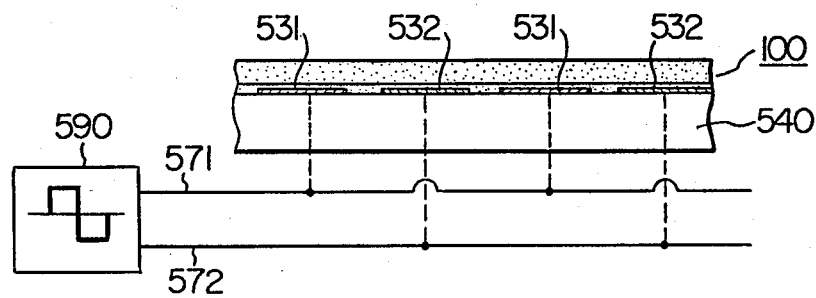

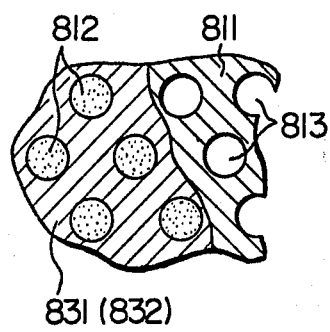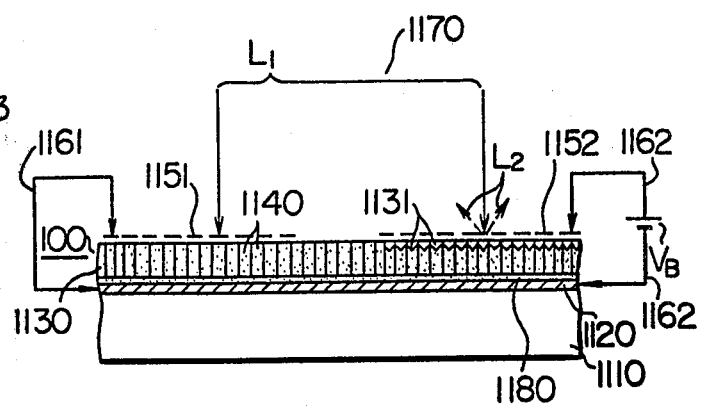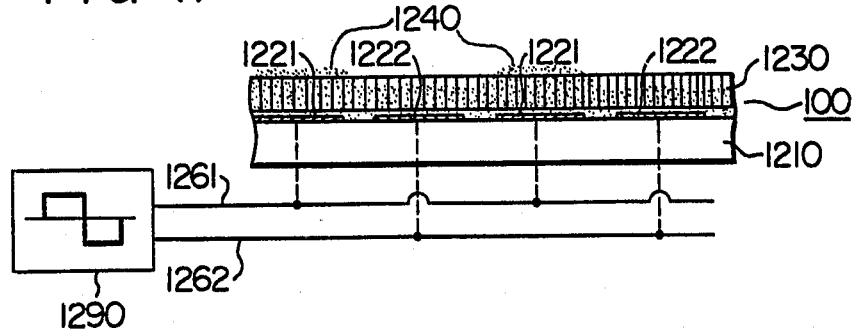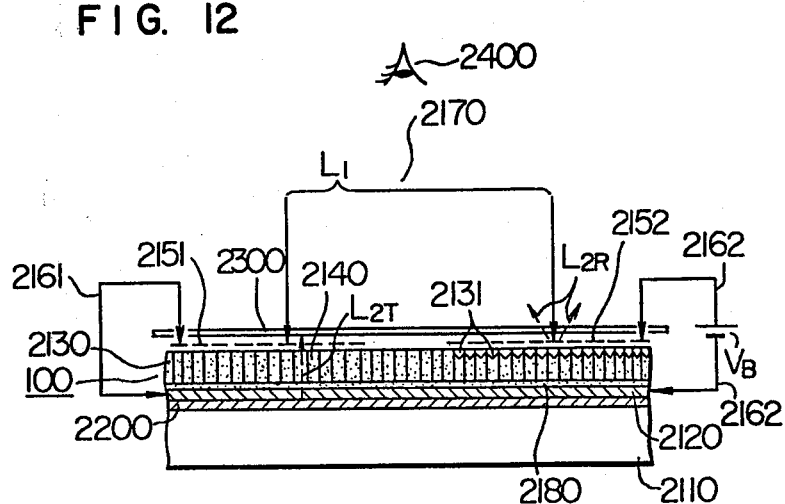

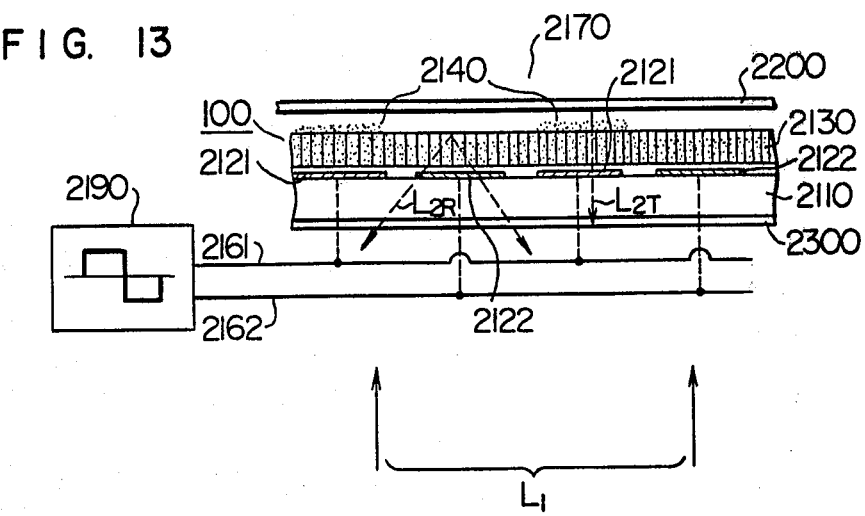
FIG. 13
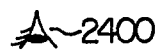
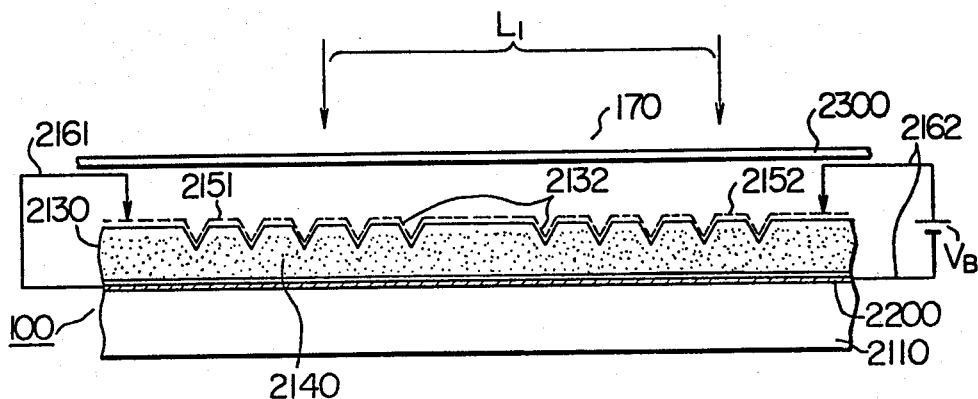
FIG. 14
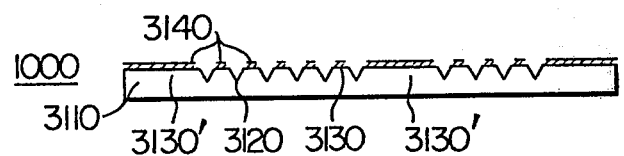
FIG. 15

DISPLAY DEVICE

The present invention relates to a light control or display device of a new principle which renders an optical property such as a light transmission factor or a light refletion factor to be changed electrically to modulate and control an externally radiated light ray.

Liquid crystal devices have been known as ones which electrically control the optical property such as light transmission factor or light reflection factor, while oil film deformation devices which utilize coulomb force of deposited charges such as those used for light valves have been known as ones which control light refracton effect.

However, the liquid crystal devices are thermally unstable and operation temperature thereof must be kept in a low and narrow temperature range such as 0° C.–60° C. in order to maintain them in a liquid crystal state. Moreover, many problems are left unresolved, such as short lifetime due to electrolysis by the mingle of moisture or electrolyte, difficulty of orienting liquid crystal molecules in a predetermined orientation, instability of operation due to ununiform film thickness and difficulty in having a large area device.

On the other hand, the oil film deformation devices need complex and expensive Schlieren optical systems for converting light refraction to a light intensity, and the elements must be held horizontally in order to keep the oil film thickness uniform. Furthermore, a special consideration must be paid for the anti-shock property of the elements and the optical system in order to avoid the instable operation.

It is an object of the present invention to provide a display device of a new principle which overcomes the difficulties of those prior display devices.

It is another objet of the present invention to provide a display structure which enables a high sensitivity of operation and a method for manufacturing the same.

It is a further object of the present invention to provide a color display device.

It is a further object of the present invention to provide an effective operation and powering system.

In principle, the display device in accordance with the present invention comprises means for applying a signal voltage to a composite body having a display structure including a film-like or plate-like porous substance of light transmissive or colored dielectric material having at least one surface thereof supported to face an open space, and light transmissive liquid material impregnated in the porous substance. By electrically controlling liquid impregnation factor at least one surface of the porous substance facing the open space through the movement of the light transmissive liquid material in the porous substance in response to the signal voltage, the light reflection factor or the light transmission factor of the composite body to an external light is controlled.

Furthermore, by providing spot-like or linear depression on the surface of the porous substance which faces the open space, a highly sensitive external light control is attained. By applying color ink on either the surface of the porous substance or a surface of a support plate which supports the porous substance, a color display device is attained.

The principle of the present invention is to control the light reflection factor or the light transmission factor at the surface of the porous substance by the impregnation factor for the light transmissive liquid material, and to control the liquid impregnation factor by electroosmotic movement.

When the porous substance is made of colored dielectric material, a reflection type display device is attained, and when the porous substance is made of light transmissive dielectric material, transmission type and reflection type display devices are provided.

In the specification, the term "porous substance" is intended to preferably include those having holes, gaps grooves or other shape, which substantially extend from one surface thereof to the opposing surface, as well as those having holes, gaps, grooves or other shape, which have openings exposed at least one surface of the substance. Therefore, the holes, gaps or grooves need not extend from one surface to the opposite surface.

These and other features and advantages of the present invention will be apparent from the following detailed description of the invention and the drawings illustrating embodiments.

FIGS. 2 and 3 show other embodiments of the display device of the present invention in association with the device shown in FIG. 1;

FIG. 4 shows a structure, in longitudinal section, of another embodiment of the display device of the present invention, and a power supply system therefor;

FIG. 5 shows a structure, in longitudinal section, of a further embodiment and a power supply system therefore;

FIG. 9 shows an upper or lower surface of the device shown in FIG. 8;

FIG. 10 shows a structure, in longitudinal section, of another embodiment of the display device of the present invention, and a power supply system therefor;

FIG. 11 shows a structure, in longitudinal section, of another embodiment of the display device of the present invention, and a power supply system therefor;

FIG. 12 shows a structure, in longitudinal section, of an embodiment of a reflection type display device of the present invention, and a power supply system therefor;

FIG. 13 shows a structure, in longitudinal section, of another embodiment of the reflection type display device of the present invention, and a power supply system therefor;

FIG. 14 shows a structure, in longitudinal section, of a further embodiment of the reflection type display device of the present invention, and a power supply system therefor;

FIG. 15 shows a structure, in section, of an embodiment of the display structure of the present invention;

Figures 21, 22:
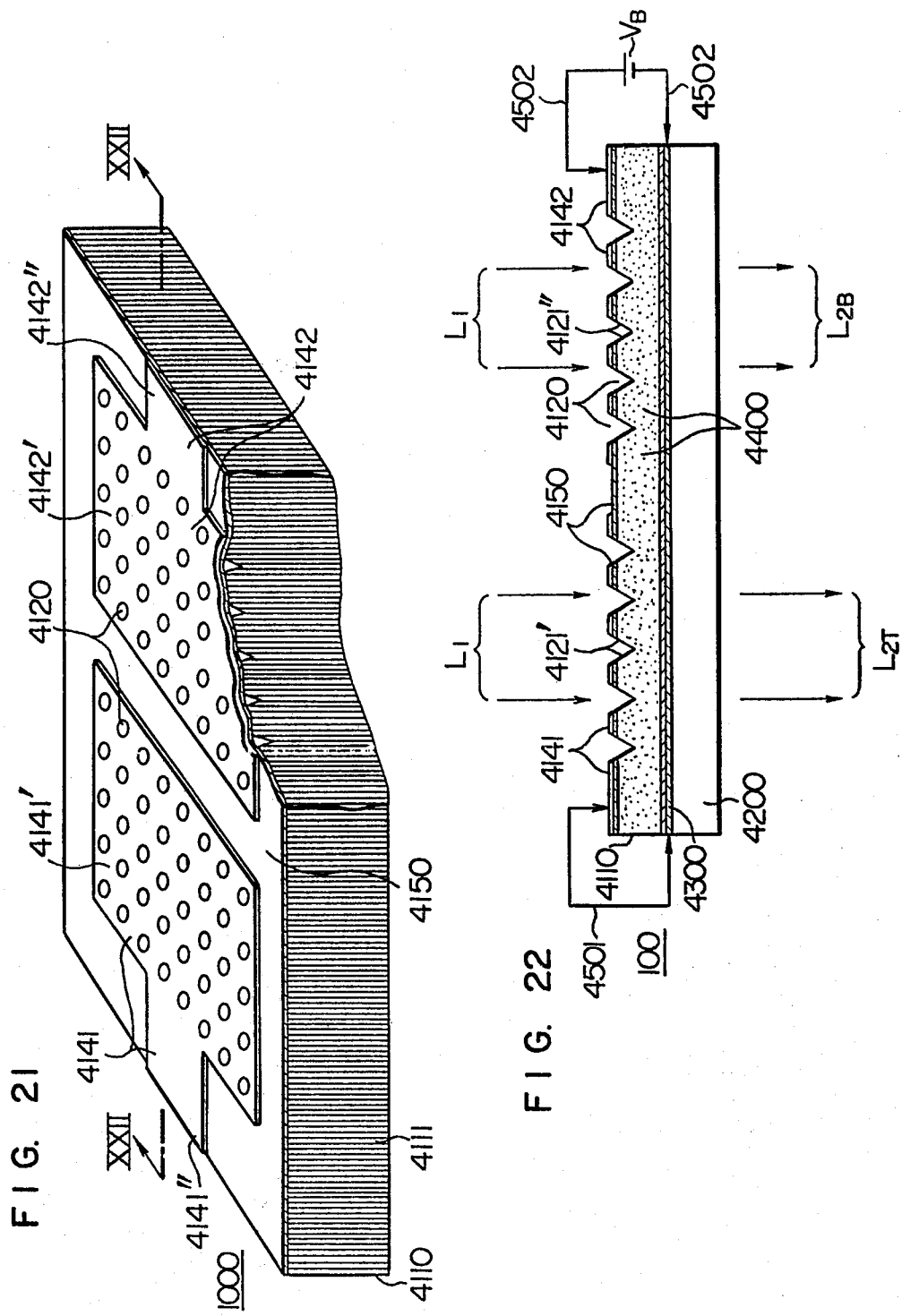
FIG. 21 shows a partial perspective view of a still further embodiment of the display structure of the present invention.
FIG. 22 shows a structure, in longitudinal section, of an embodiment of the display device of the present invention which uses the display structure shown in FIG. 21, and a power supply system therefor.
Figure 24A:
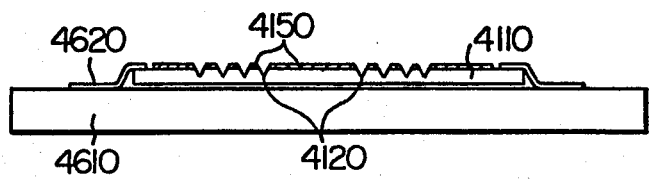
Figure 25:
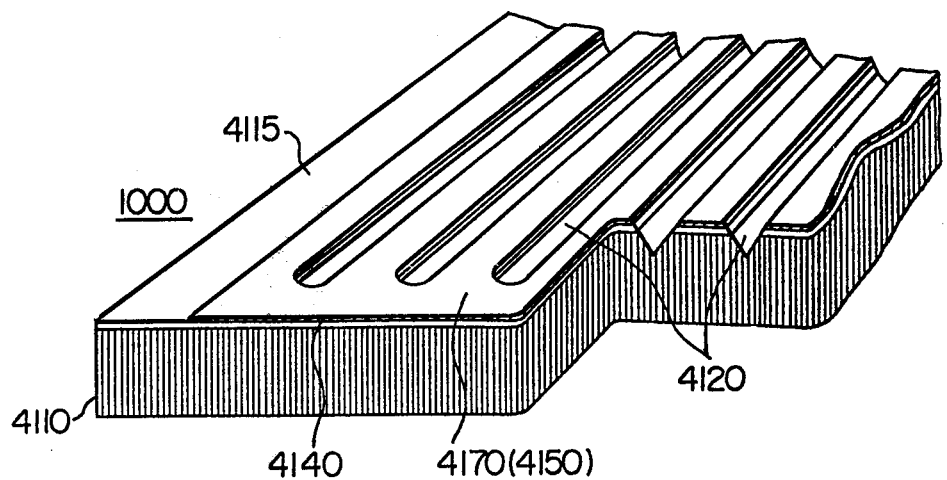
Figure 26:
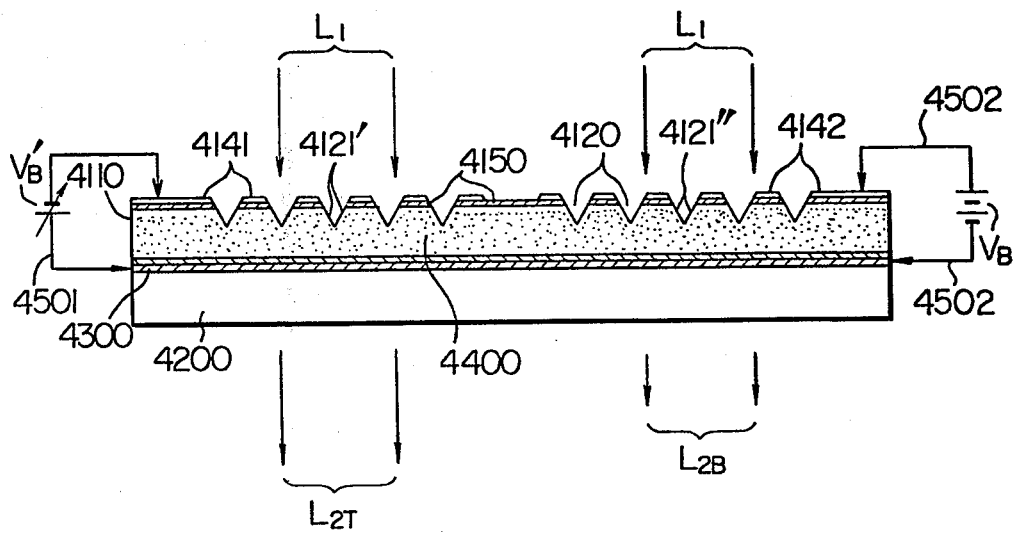
Figure 27:
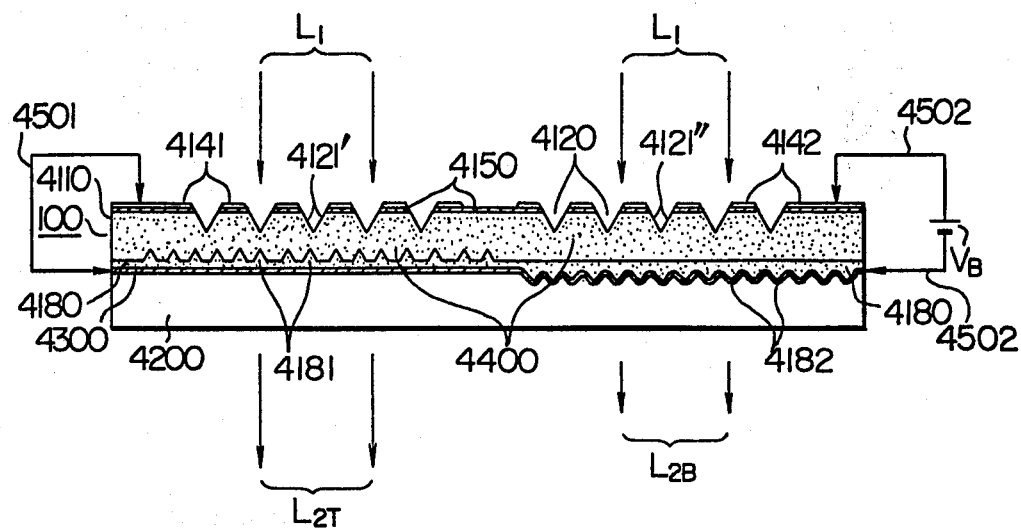
Figure 29:
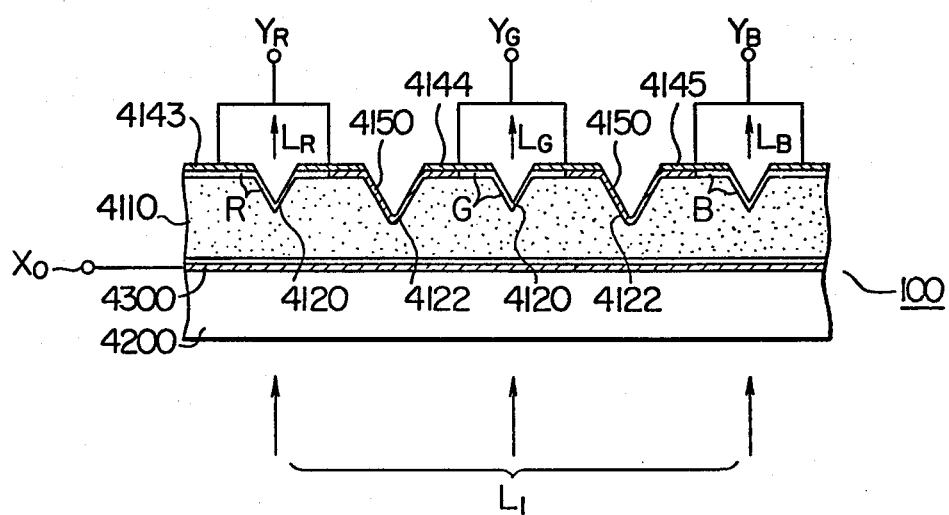
Figure 28:
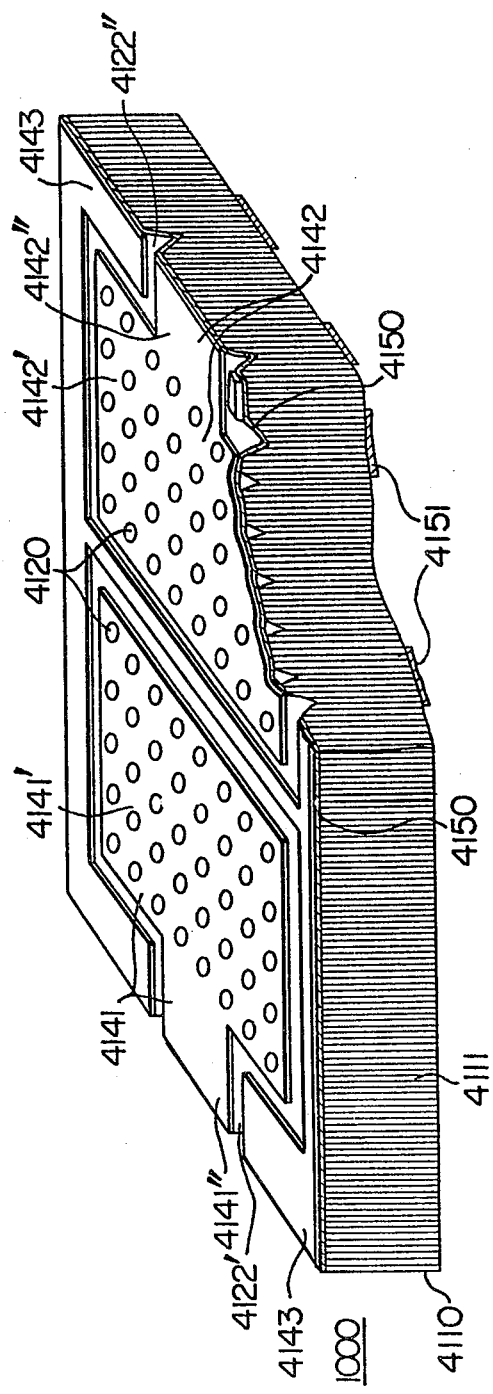
Figure 30:
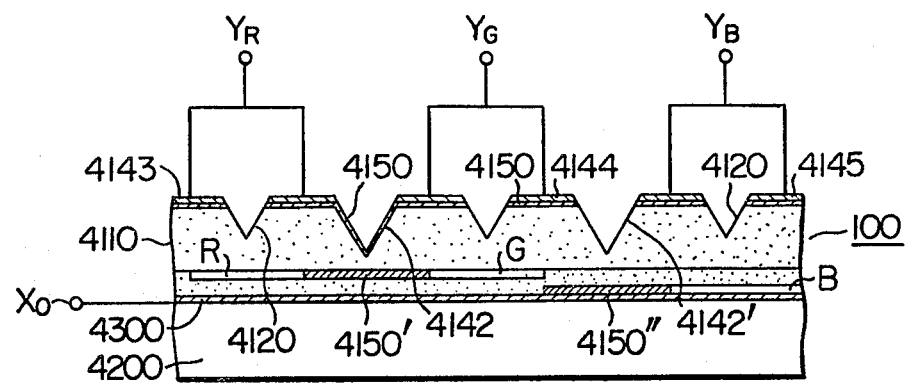
Figure 31:
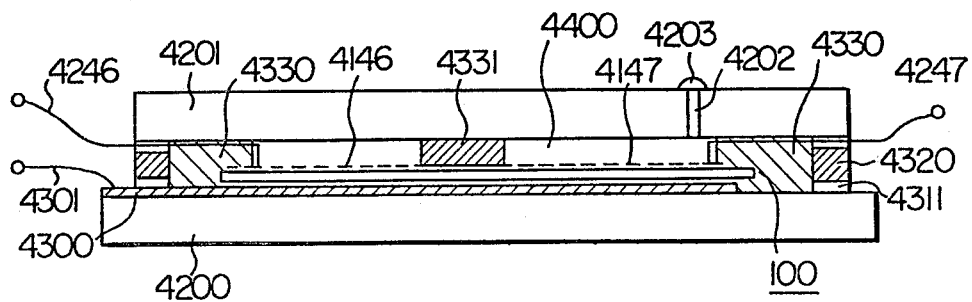

FIG. 24A, B and C show manufacturing process for the display structure of the present invention;

FIG. 25 shows a structure, in longitudinal section, of an embodiment of the display structure of the present invention;

FIG. 26 shows an improved power supply system for the display device of the present invention;

FIG. 27 shows a structure, in longitudinal section, of an improved embodiment of the display device of the present invention, and a power supply system therefor;

FIG. 28 shows a partial perspective sectional view of an embodiment of the display structure of the present invention for illustrating the electrode separation formation for the display structure shown in FIG. 21;

FIG. 29 shows a partial structure, in longitudinal section, of one embodiment of the transmission type color display device of the present invention;

FIG. 30 shows a structure, in longitudinal section, of another embodiment of the color display device of the present invention;

FIG. 31 shows a structure, in longitudinal section, of a packaging assembly of the display device of the present invention.

Figure 1:
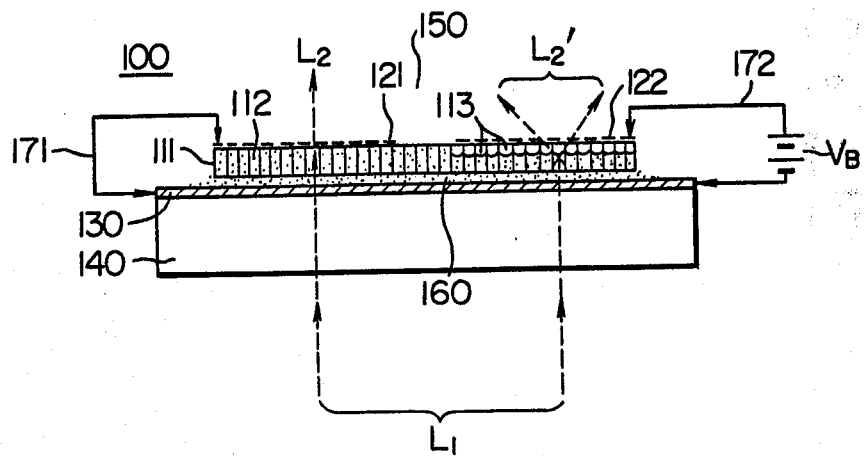
FIG. 1 shows a structure, in longitudinal section, of one embodiment of the display device of the present invention and illustrates the principle of operation.

FIG. 1 shows a longitudinal sectional view of a structure of one embodiment of the display device in accordance with the present invention and a feeding system therefor. It should be noted that in the present embodiment as well as the other embodiments each element is illustrated in an enlarged scale for the sake of convenience of explanation so that a relative dimenson thereof may not always correspond to the description in the specification.

In FIG. 1, numeral 100 denotes a composite body comprising a film-like or plate-like porous substance 111 of light transmissive dielectric material and light transmissive liquid material 112 impregnated in the porous substance 111. Provided on a surface of the porous substance 111 are light transmissive electrodes 121 and 122 which are electrically insulated from each other. The elements 111, 121 and 122 from a display structure. The composite body 100 is mounted and supported on a support plate 140 such as a transparent glass plate having a light transmissive electrode 130 of a metal oxide such as tin oxide deposited on a surface thereof. The surface of the porous substance 111, that is, the composite body 100 which faces the electrodes 121 and 122 directly faces an open space 150.

The porous substance 111 is not bonded to the electrode 130 but it is merely placed on it to leave a gap 160 therebetween, into and out of which light transmissive liquid material 112 can flow as shown in FIG. 1.

In the illustrated embodiment, the porous substance 111 has a plurality of separate pores 113 extending through the thickness of the substance and the liquid material 112 is impregnated in those pores 113.

A preferable example of the light transmissive dielectric material is an organic synthetic resin such as nitrocellulose, cellulose acetate or mixture thereof. Those are transparent dielectric materials, and indexes of refraction $n_d$ of nitrocellulose and cellulose acetate are approximately 1.51 and 1.47, respectively, and that of the mixture is an intermediate value of those two. The porous substance 111 can be manufactured by a known manufacturing method in which the material such as those above is dissolved in appropriate solvent and resulting solution flows onto a flat plate to a small thickness and pores are formed with pore diameter controlled by the evaporation rate of the solvent. It is used in a form of a so-called microporous membrane filter.

The microporous membrane filter has an indefinite number of pores of substantially circular cross section which essentially extend from one surface to the opposite surface. Microporous membrane filters having an average pore diameter of 0.1-8 $\mu$m, a thickness of 20-200 $\mu$m and a porosity of 50-80% may be formed with ease. Any of these filters can be used as the porous substance 111 but for the purpose of attaining a low operation voltage and a fast response in the present device those having average pore diameter of 0.1-0.65 $\mu$m and thickness of 40-150 $\mu$m are particularly useful.

The light transmissive electrodes 121 and 122 can be constructed by vacuum evaporating copper or the like on the surface of the porous substance 111 to the thickness of approximately 70-80 Å, immersing it into iodine solution including organic solvent such as carbon tetrachloride for reaction therewith to form transparent conductive films consisting of cuprous iodide, which together with the porous substance 111 form the display structure. Since the electrodes 121 and 122 formed by the conductive films are much thinner than the pore diameter of the porous substance, the pores at the surface of the porous substance 111 are not clogged by the conductive films to permit the liquid material 112 to flow in and out. In other words, they are constructed to be liquid permeative. That is, the electrodes 121 and 122 are constructed to be porous in correspondence to the pores of the porous substance 111, and also to be liquid permeative.

The display device of the present invention makes use of electroosmotic movement of the light transmissive liquid material 112 for the porous substance 111.

Accordingly, the light transmissive material 112 must have high electroosmotic mobility to the light transmissive dielectric material forming the porous substance 111.

Examples of the light transmissive dielectric material forming the porous substance 111 are, in addition to those described above, synthetic resin such as polypropylene, vinyle chloride or polyamid (nylon), which is not highly light transmissive, however, glass material such as soda glass, borosilicate glass or silica glass; or metal oxide or ceramic material such as silicon oxide (silica) or aluminum oxide (alumina). When filter-like porous substance of lateral fiber type is to be formed, natural fiber such as pulp may be used.

Therefore, the light transmissive liquid material 112 should have high electroosmotic mobility to the light transmissive dielectric material forming the porous substance 111 and hence it should have low viscosity and high electric resistivity, should be chemically stable, and since at least one surface thereof faces an open space it should have high boiling point, low vapor pressure and should be in liquid state at room temperature.

For those requirements, transparent liquid material having either monosilane structure or siloxane structure and having at least one of alkoxy group or alkyl group as a functional group is useful.

Examples of particularly useful material are shown below together with indexes of refraction thereof. Monosilane group; methacryloxypropyltrimethoxy silane

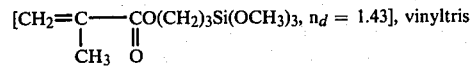

($\beta$-methoxyethoxy) silane [CH$_2$=CHSi(OCH$_2$CH$_2$OCH$_3$)$_3$,

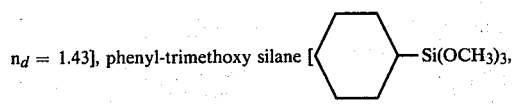

$n_d$ = 1.47], methyl triethoxy silane [OH$_3$Si(OC$_2$H$_5$)$_3$, $n_d$ = 1.38] and tetramyl silicate [Si(OC$_5$H$_{11}$)$_4$, $n_d$ = 1.42]:

Siloxane group; dimethyl triphenyl trimethoxy siloxane

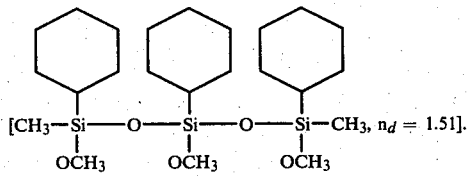

Another example of the light transmissive liquid material 112 is naphthalene liquid material having either halogen group or alkyl group as a functional group, such as $\alpha$-chloronaphthalene ($n_d$=1.63) or $\alpha$-methyl naphthalene.

The light transmissive liquid material 112 may be one or more than one of the materials mentioned above, or those materials may be used by dissolving the material in solvent consisting of liquid having a low vapor pressure, a high boiling point, a low viscosity of approximately 3–100 centistokes and lower electroosmotic mobility than those mentioned above such as dimethyl silicon oil ($n_d$×1.33–1.40) methyl phenil silicon oil ($n_d$=1.42–1.43) or ethyl diphenyl ($n_d$=1.59).

The light transmissive liquid material 112 can thus be formed from one or more liquid materials with or without solvent. In order to make the composite body 100 light transmissive when the light transmissive liquid material 112 is impregnated into the porous substance 111, an index of refraction of the liquid material 112 is selected to be equal to or close to an index of refraction of the light transmissive dielectric material forming the porous substance 111. When the liquid material 112 having an index of refraction which is substantially equal to that of dielectric material forming the porous substance 111 is available, the liquid material 112 may be formed by a single material having electroosmotic mobility.

As an example, when the porous substance 111 is made of nitrocellulose, dimethyl-triphenyltrimethoxysiloxane ($n_d$=1.51) is useful as the liquid material 112, and when cellulose acetate is used, phenyl-trimethoxysilane ($n_d$1.47) is useful.

When the indexes of refraction are not coincide, at least one light transmissive liquid material having a larger index of refraction than that of the light transmissive dielectric material forming the porous substance 111 and at least one light transmissive liquid material having a smaller index of refraction are mixed at an appropriate proportion so that the resultant index of refraction of the light transmissive liquid material 112 are made equal to or close to that of the porous substance 111.

In this case, it should be understood that at least one material forming the mixed liquid material 112 has a high electroosmotic mobility so that the light transmissive liquid material 112 exhibit, as a whole, electroosmotic mobility to the porous substance 111.

As an example, when the porous substance 111 is mixture of nitrocellulose and cellulose acetate, an index of refraction $n_d$ is intermediate 1.47 and 1.51. According, dimethyl-triphenyl-trimethoxysiloxane and phenyl-trimethoxysilane are mixed at an appropriate proportion to obtain equal index of refraction.

When tetraamylsilicate or methyl-triethoxy silane having a lower index of refraction than that of the cellulose porous substance 111 mentioned above is used, $\alpha$-chloronaphthalene, $\alpha$-methylnaphthalene or ethyldiphenyl, which has higher index of refraction, may be added to form the light transmissive liquid material 112 having an approximately equal index of refraction.

When the cellulose acetate porous substance 111 is used, vinyl-tris($\beta$-methoxyethoxy)silane, tetraamyl silicate or methyl-triethoxysilane may be used as the electroosmotically mobile liquid material of low index of refraction.

On the other hand, when liquid material of high index of refraction such as $\alpha$-chloronaphthalene or $\alpha$-methylnaphthalene is used as the electroosmotically mobile liquid material, low index of refraction material such as dimethyl silicone oil, methylphenyl silicone oil, methyl-triethoxysilane, tetraamyl silicate, vinyl-tris($\beta$-methoxyethoxy)silane may be added to make an index of refraction equal to that of the light transmissive dielectric material forming the porous substance 111.

When necessary, auxiliary agent such as charge controlling agent or surface activation agent may be added to the porous substance 111 or light transmissive liquid material 112.

The porous substance 111 is made of light transmissive dielectric material but when it is placed in the air, air ($n_d$≃1) exists in the pores so that it appears to be white an opaque because it diffusereflects light rays because of mismatch of the index of refraction with the porous substance 111.

When the light transmissive liquid material 112 having an index of refraction equal to or close to that of the porous substance 111 is impregnated, the mismatch of the index of refraction is eliminated and the composite body appers to be transparent.

Accordingly, in FIG. 1, when the electrodes 130 and 121 are interconnected via a conductive line 171 to keep them at the equal potential, the corresponding portion of the composite body 100 becomes transparent so that when it is illuminated by an incident light $L_1$, the incident light $L$, passes straight therethrough the produce an output light $L_2$.

On the other hand, when a D.C. potential $V_B$ is applied across the electrodes 130 and 122 via a conductor 172, electric double layers are created at contact interfaces between wall surfaces of the pores 113 of the porous substance 111 and the light transmissive liquid material 112 such that the porous substance 111 is negatively charged and the liquid material 112 is positively charged. As a result, the liquid material 112 electroosmotically moves along the wall surfaces of the pores 113 toward the negative electrode, that is, the electrode 130 and flows into the gap 160.

As a result, the liquid impregnation factor of the pores 113 at the surface portions facing the electrode 122 or the open area 150 lowers and the pores become void as shown in FIG. 1. Thus, mismatch of index of refraction occurs at that portion at the places corresponding to the pores 131 so that the output light $L_2$ corresponding to the input light $L_1$ is a scattered transmitted light $L_2'$ as shown in FIG. 1 and it appears to be white and opaque. The higher the potential $V_B$ is, the more remarkable is this phenomenon. When the D.C. voltage $V_B$ is lowered to zero, the liquid material 112 fills the voids by capillary action and the portion under the electrode 122 becomes transparent as is the portion under the electrode 121.

An experimental example is given below; when a combination of cellulose porous substance 111 having thickness of 120 $\mu$m and pore diameter of 0.3–0.65 $\mu$m and the light transmissive liquid material 112 mentioned above is used, light scatter occurs by a D.C. voltage $V_B$ between 20–200 volts, although it varies depending on particular materials used.

In the display device of the present invention, the liquid impregnation factor at the surface of the porous substance facing the open area is controlled by electroosmotic movement. Since the movement of the light transmissive liquid material 112 in the order of several microns creates the mismatch of the index of refraction to enable the scatter of external light, a high quality of impregnation of the light transmissive liquid material 112 into the porous substance 111 is essential.

Accordingly, it is preferable that the liquid material 112 has a wet contact angle of no larger than 90 degrees to the light transmissive dielectric material forming the porous substance 111.

The above combination satisfies this requirement.

A direction of electroosmotic movement of the liquid material 112 in the porous substance 111 is determined by correlation between the liquid material 112 and the light transmissive dielectric material forming the porous substance 111.

In case of the combination of the materials mentioned above, the liquid material 112 makes negative electroosmotic movement, as is usual in many cases.

However, there exists a combination of the liquid material 112 and the porous substance 111 which permits positive electroosmotic movement. In this case, a similar operation can be performed by reversing the polarity of the voltage source shown in FIG. 1.

In order to attain a high sensitivity operation, it is important to select the liquid material 112.

When the liquid material 112 is made of mixture of a plurality of different liquids, it is desirable to use the liquids having the same polarity of electroosmotic mobility.

In impregnating the liquid material 112 into the porous substance 111, the amount of the liquid material 112 to be impregnated is to be limited as small as possible so long as a transparent state can be maintained because a sensitivity is lowered if the liquid material is impregnated to such an extent that it overflows onto the electrodes 121 and 122 under nonpowered condition.

In the embodiment shown in FIG. 1, the light transmissive electrodes 121 and 122 facing the open area are insulated from each other to form a plurality of divided electrodes. Alternatively, those may not be divided but may be formed by a single electrode and instead the electrode 130 or the support plate 140 may be divided into a plurality of sections, to which voltages are selectively applied. Such an electrode structure can be used not only in the present embodiment but also other embodiments to be described later where opposing electrodes are provided across the porous substance.

When necessary, both of the opposing electrodes may be constructed by a plurality of electrode sections insulated from each other and voltages may be selectively applied thereto.

The light transmissive and liquid impregnant electrodes facing the open area 150 may be made of, in addition to the material used in the present embodiment, evaporated film of metal oxide such as indium oxide, tin oxide or solid solution thereof.

It may be prepared by forming an evaporated film on the surface of the porous substance, by electron beam evaporation or the like of the metal oxide mentioned above, in an oxygen atmosphere of approximately $10^{-4}$–$10^{-3}$ mmHg. Because of the need of liquid impregnation property, the thickness thereof may be selected, in principle, to be no larger than the diameter of the pores 113 of the porous substance 111. Usually, the thickness is selected to be much smaller, e.g. approximately 200–800 Å.

Figure 2:
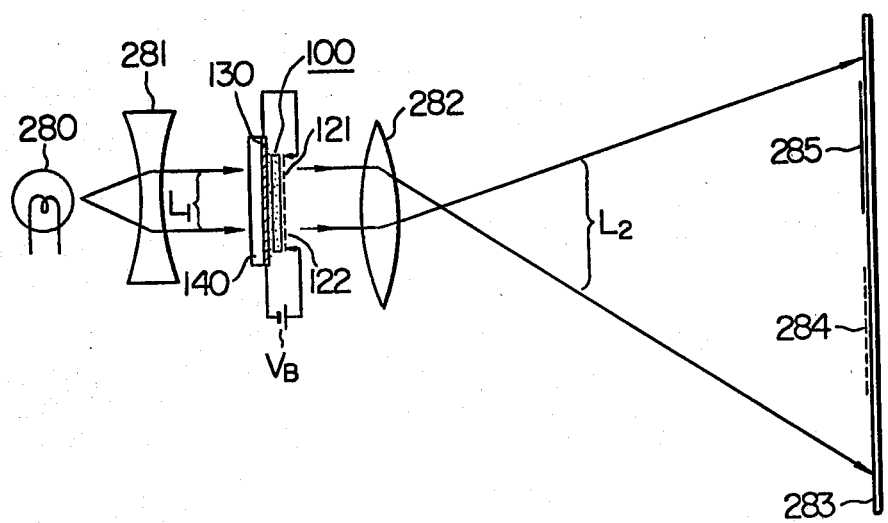

FIG. 2 shows an embodiment of a display device which utilizes the device shown in FIG. 1 for electrically controlling light transmission to create a dark—bright pattern.

In FIG. 2, numeral 280 deonotes a light source, numeral 281 denotes a condense lens system, numeral 282 denotes a projection lens system, numeral 283 denotes a projection screen, $L_1$ denotes an input light and $L_2$ denotes a transmitted projected light. The display device shown in FIG. 1 is placed between the lens systems 281 and 282. Since the liquid material 112 is impregnated in the capillary pores of the porous substance 111, it does not flow out and hence the display device may be mounted in any manner. This is an essential difference from a prior device which utilizes oil film deformation due to coulomb force. Since that portion of the composite body 100 which faces the light transmissive electrode 121 is transparent, it creates a bright projected image 284 on the screeen 283. On the other hand, since that portion which faces the light transmissive electrode 122 causes light scatter because of the application of the D.C. voltage $V_B$ and the light transmission factor at that portion is lowered, it creates a dark projected image 285. In this manner, light intensity can be electrically controlled.

FIG. 3 shows another embodiment of the display device which uses the device shown in FIG. 1 to electrically control the light intensity with higher sensitivity. In FIG. 3, numeral 380 denotes a collimated light generator which, together with opaque parallel gratings 381 and 383 and lens systems 382 and 384, forms a known Schlieren projection system. The device shown in FIG. 1 is displaced between the lens 382 and the grating 383. The arrangement is such that when the composite body 100 is transparent, an image $L_1$ of the parallel grating 381 is focused on the parallel grating 383 through the lens system 382 so that an output light image $L_2$ does not leak from the gaps of the grating. In this case, there exists no output light $L_2'$ which projects an image on the surface of the composite body 100 onto the screen 283 through the lens system 384.

Accordingly, a transparent portion of the composite body 100 like the portion facing the light transmissive electrode 121, creates a dark projected image 385 on the screen 283 while a light scattered portion like the portion facing the light transmissive portion 122 creates a bright image 385' because the light scatter permits the output light $L_2'$ to pass through the gaps of the parallel grating which otherwise serves as a light stopper. Unlike the prior display device utilizing the oil film deformation, the display device of the present invention can be mounted in any manner and a high sensitivity operation is attained because ununiformity of index of refraction at the pores of the surface of the porous substance is utilized.

While the embodiment of two light transmissive electrodes 121 and 122 has been shown and described for the purpose of explaining the principle of operation, the electrodes of the present embodiment as well as the other embodiments to be described later may be replaced by conventionally used seven-segment light transmissive electrodes insulated from each other, and voltages may be selectively applied thereto to display numerical digits. It should be understood that the electrode 130 may be replaced by the seven-segment electrode which is selectively activated to attain the same numeric display.

FIG. 4 shows a structure, in longitudinal section, of another embodiment of the display device of the present invention and a power supplying system therefor. Unlike the embodiments shown in FIGS. 2 and 3 which use the lens system for projection, the present embodiment is intended to provide a direct view type display device using reflection.

Numeral 100 denotes the composite body as previously explained. Deposited on a surface thereof are three porous and light transmissive electrodes 421, 422 and 423 insulated from each other. They are connected to a switch S via conductors 471, 472 and 473, respectively.

Numeral 440 denotes a support plate such as glass plate, on which an electrode 430 made of tin oxide or the like is deposited. On the electrode 430, a thin light absorbing layer 431 such as carbon black or similar paint is deposited to the thickness of 2-20 μm (micron). The composite body 100 is disposed thereon. If desired, the light absorbing layer 431 may be deposited on a surface of the composite body 100 facing the support plate 440. In any case, so long as the layer 431 is constructed to permit the impregnation of the light transmissive liquid material and located between the composite body 410 and the electrode 430, the exact position thereof is immaterial. The electrode 430 is coupled, via a conductor 470, to a variable D.C. power supply $V_B$ which is connected to the switch S. By manipulating the switch S to select terminal a, b or c, the D.C. voltage $V_B$ is selectively applied to the electrode 423, 422 or 421. Assuming that the switch S selects the terminal a as illustrated in FIG. 4, the portions of the composite body 100 which face the electrodes 421 and 422 are transparent because no voltage is applied thereto. As a result, an external light $L_1$ transmits through the light transmissive electrodes 421 and 422 and the composite body 100 and then absorbed by the light absorbing layer 431. Therefore, those portions appear dark.

On the other hand, the portion of the composite body 100 which faces the electrode 423 diffuse-reflects the external light $L_1$ because the electrode 430 is kept negative potential by the D.C. voltage and the light transmissive liquid material electroosmotically moves toward the electrode 430 in the porous substance, as explained with reference to FIG. 1. As a result, that portion appears bright or white. The higher the magnitude of $V_B$, the brighter or more white becomes the image.

In a similar way, when the switch S is connected to the terminals b or c, the portion facing the electrode 422 or 421, respectively, appears bright while the rest appears dark. In this manner, a reflection type display device is provided.

In the present embodiment, when the light absorbing layer 431 is a light absorbing and conductive film such as graphite conductive paint, this single layer can serve as both the electrode 430 and the light absorbing layer 431. In this case, the conductive and light absorbing layer may be deposited on the support plate 440 or it may be deposited on the composite body 100.

Another more preferable structure of the reflection type display device can be constructed by replacing the light absorbing layer 431 in FIG. 4 by a light reflective film such as a dielectric mirror which is formed by alternately stacking metal evaporated films of high index of refraction such as aluminum, nickel or silver film and evaporated films of low index of refraction such as zinc sulfide or magnesium fluoride. At the transparent portion of the composite body 100, the external light $L_1$ is not scattered but transmits and it is reflected at the light reflective layer. As a result, that portion appears dark.

On the other hand, at the portion, like the portion facing the electrode 423 of FIG. 4, at which the D.C. voltage is applied to cause the electroosmotic movement, the external light $L_1$ is scattered and reflected at the surface of the composite body 100. However, since a portion of external light $L_1$ transmitted through the composite body 100 is reflected by the light absorbing layer 431 and is scattered again at the surface of the composite body 100, light utilization factor is improved and an efficient dark-bright display is attained.

Since the light reflective film made of metal evaporated film can serve as an electrode, it may be evaporated on the support plate 440 to serve as the electrode 430.

The metal evaporated film may be deposited on the surface of the composite body 100 which faces the support plate 440. In this case, it may serve as a light absorbing layer rather than a light reflective layer, and it may also serve as the electrode 430.

When the electrode 430 is a transparent electrode such as metal oxide, the layer 431 which serves as the light absorbing layer or the light reflective layer may be mounted on the surface of the electrode 430 which is opposite to the desposition surface of the electrode 430 and faces the support plate 440. In this case, the layer 431 may be deposited on the surface of the support plate or it may be deposited on another support plate and mounted to keep an appropriate distance from the surface of the main support plate. While the electrode facing the open area is divided into the electrode sections 421, 422 and 423 in the illustrated embodiment, the electrode 430 may be divided to attain a similar operation.

FIG. 5 shows a partial structure, in longitudinal section, of the display device of the present invention which is useful to control the light transmission, and a powering system therefor.

Numeral 100 denotes a composite body as described with reference to FIG. 1. It is mounted on a transparent glass support plate 540 on which two sets of alternately arranged electrodes 531 and 532, which are made of transparent conductive films such as tin oxide, are deposited. Space between one electrode 531 and adjacent electrode 532 is, for example, 10 μm and length of the conductive land is longer than the space, for example, 300 μm.

The composite body 100 may be formed by a porous substance made of a microporous membrane filter of cellulose acetate ($n_d \simeq 1.47$) having a thickness of 40–120 μm and average pore diameter of 0.5 μm, and light transmissive liquid material made of mixture of methacryloxypropyl-trimethoxy silane ($n_d = 1.43$) and α-methylnaphthalene ($n_d = 1.61$).

The electrodes 531 and 532 are connected to a power supply 590 via conductors 571 and 572, respectively.

Figure 6A:
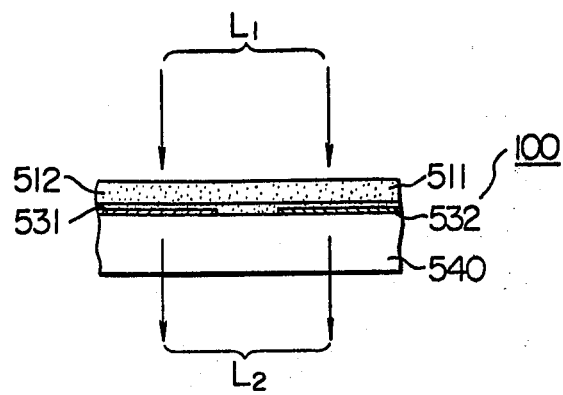
FIGS. 6A and 6B illustrate the principle of operation thereof.
Figure 6B:
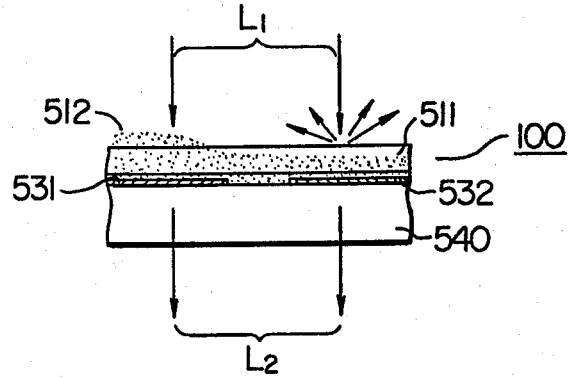

FIGS. 6A and 6B show portions of the device shown in FIG. 5 to illustrate the operation thereof.

FIG. 6A illustrates the operation when no voltage is applied across the electrodes 531 and 532. The light transmissive liquid material is uniformly impregnated in the porous substance 511 by surface tension and capillary action so that the composite body 100 appears transparent. As a result, an external light $L_1$ transmits therethrough to produce an output transmitted light $L_2$.

On the other hand, when a negative potential is applied to the electrode 531 relative to the electrode 532 as shown in FIG. 6B, the light transmissive liquid material 512 described above electroosmotically moves toward the negative electrode in the porous substance 511. As a result, the liquid material 512 is collected at the negative electrode 531 and the liquid impregnation factor at the positive electrode 532 lowers. Accordingly, a high light transmission is attained at the negative electrode 531, but at the positive electrode 532 the input light $L_1$ is diffuse-reflected by the surface of the composite body 100 facing the open space so that the amount of the transmitted output light $L_2$ is reduced.

This trend becomes more remarkable as the magnitude of applied voltage increases. When the applied voltage is reduced to zero, the condition shown in FIG. 6A is instantly restored by the surface tension of the liquid material 512 and the capillary action. When the polarity of the applied voltage is reversed, the liquid impregnation factor at the electrode 531 lowers, as opposed to the condition shown in FIG. 6B, and the light transmission factor is reduced. In an experiment for the arrangement described above, the liquid impregnation factor at the electrode 531 and 532 starts to change, by the electroosmotic movement, at the applied voltage of 0.1 volt and it substantially saturates at approximately 8–20 volts. Response to the voltage application is fast and the device can respond to an A.C. frequency of up to 500–1000 Hz.

Thus, by applying a square wave or sinusoidal wave A.C. voltage having a frequency lower than that, an effective light transmission factor of the composite body 100 can be reduced in response to the voltage amplitude.

More efficient control of light transmission can be attained by assembling the device into an optical projecting system as shown in FIG. 2 or a Schlieren optical system as shown in FIG. 3. When the electrodes 531 and 532 are liquid impregnative, they may be mounted on the surface of the porous substance 511 which is opposite to the support plate 540.

Figure 7:
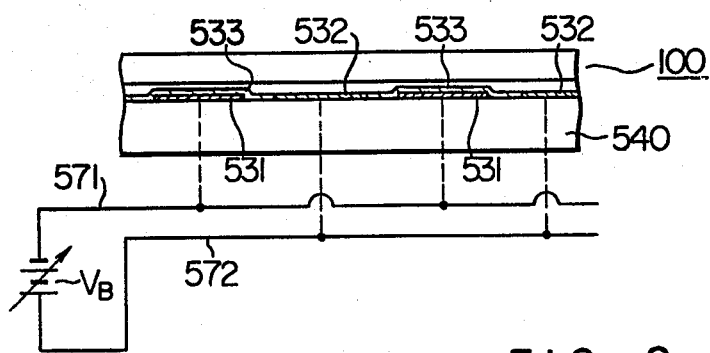
FIG. 7 shows a structure, in longitudinal section, of another embodiment of the display device of the present invention, and a power supply system therefor.

FIG. 7 shows a partial longitudinal sectional view of another embodiment of the display device of the present invention, and a powering system therefor.

A difference from the device shown in FIG. 5 lies in that at least conductive area of one of the electrodes 531 and 532 is substantially opaque.

In the illustrated embodiment, a thin opaque layer 533 made of black paint such as carbon black is applied on the electrode 531 to make opaque the conductive area of the electrode 531 and the space. When the space is narrow, the opaque layer 533 at the space may be omitted.

When the electrode 531 is made of opaque material such as evaporated film of aluminum or other metals or graphite, the opaque layer 533 may be omitted and the opaque electrode 531 serves as the opaque layer. The electrodes 531 and 532 are connected to a variable D.C. power supply $V_B$ via conductors 571 and 572, respectively.

When the composite body 100 is constructed with the porous substance and the light transmissive liquid material, like the composite body shown in FIG. 5, by the application of the D.C. voltage, the liquid material electroosmotically moves toward the negative electrode 531 depending on the magnitude of the applied voltage. As a result, the liquid impregnation factor at the positive electrode 532 reduces the light scatter occurs causing effective light transmission factor to be lowered.

The liquid impregnation factor at the negative electrode 531 increases and the composite body 100 itself assumes transparent state. However, the light transmission is blocked by the presence of the opaque layer 533 or opaque electrode 531.

Therefore, comparing the present embodiment with the embodiment of FIG. 5 in which transparent state and light scatter state coexist, the former can attain much more efficient control of light transmission. Again, by assembling the display device of the present embodiment into an optical projection system or a Schlieren optical system as shown in FIGS. 2 or 3, more effective electrical control of light transmission is attained.

Figure 8:
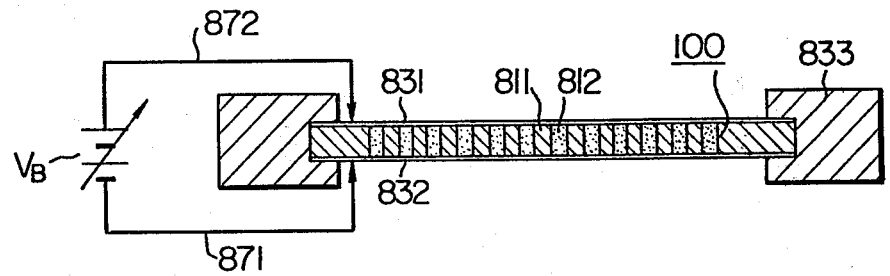
FIG. 8 shows a structure, in longitudinal section, of a further embodiment and a power supply system therefor.

FIG. 8 shows a structure in longitudinal section, of another embodiment of the display device of the present invention, and a power supply system therefor.

FIG. 9 shows a partial plan view of the device of FIG. 8, when viewed from an upper or lower surface. In the right section of the figure, the light transmissive liquid material is omitted for the convenience of explanation.

Referring to FIGS. 8 and 9, a porous substance 811 is made of transparent glass or the like. It is formed by binding a plurality of hollow glass tubes, fusing them, slicing the resulting assembly to form a plate-like structure and polishing it. The structure is similar to a known glassfiber plate except that glass-fibers are replaced by hollow tubes to provide circular through-holes.

Circular holes 813 extending from an upper surface to a lower surface have average hole diameter of approximately 30–70 μm. The porous substance 811 has a thickness of approximately 200–2000 μm (micron). Deposited on the upper and lower surfaces of the porous substance 811 are light transmissive electrodes 831 and 832, respectively, made of tin oxide or the like, which are connected to a variable D.C. power supply $V_B$ via conductors 871 and 872, respectively. The composite body 100 is fixed to a support plate 833 made of plastic material or the like.

Light transmissive liquid material is impregnated in the circular holes 813. When the porous substance 811 is made of soda glass ($n_d=1.51$), the electroosmotically mobile and light transmissive liquid material 812 may be triphenyl-trimethoxy-dimenthyl siloxane ($n_d=1.51$), and it is impregnated until a liquid level becomes substantially flat with the surfaces of the electrodes 831 and 832.

In the illustrated embodiment, both surfaces of the composite body 100 face the open space. As a result, so long as the light transmissive liquid material 812 is electroosmotically mobile in the porous substance 811, voids are formed at either the electrode 831 or 832 if a voltage is applied thereto, regardless of its polarity. Thus, the liquid impregnation factor is reduced and light scatter occurs thereat. In this manner, effective light transmission factor is reduced and control of light transmission is attained.

In the illustrated embodiment, the liquid material electroosmotically moves toward the negative electrode. Thus, when the power supply system shown in FIG. 8 is employed, the liquid impregnation factor at the electrode 831 to which a positive potential is applied is reduced. A preferred operation voltage is 100–300 volts.

The operation for the composite body structure having both surfaces faced to the open space is equally applicable to the microporous membrane filter made of porous substance described above. Accordingly, in the device in accordance with the present invention, it is sufficient when at least one surface is faced to the open area. While the light transmissive dielectric material forming the porous substance 811 of FIG. 8 is glass, the porous substance may be made of hollow plastic fiber tubes, or a plastic sheet may be chemically or mechanically drilled.

The porous substance may also be formed by comprising fine particles of metal oxide or ceramics such as glass, alumina or silicon oxide into a plate, shaping it and heating it to fuse the fine particles to leave pores or gaps which substantially continuously extend from one surface to other surface, whatever path they follow.

The microporous membrane filter type porous substance is particularly effective. Light transmissive dielectric material useful for this purpose is vinyl chloride, polypropylene or polyamid (nylon) although the last one has relatively low light transmission factor.

While the porous substance has been described as film, plate or particles, it may be formed of other fiber material such as ordinary paper or textile. Examples are synthetic resin such as nitrocellulose, cellulose acetate, mixture thereof, propylene or polyamid; natural fiber such as cellulose; and glass fiber. The only requirement is that laterally extending fibers form a film or cloth and gaps between adjacent fibers form filter which permits liquid to transmit preferably thicknesswise. Thus, the porous substance may be made of any of a variety of material or combination thereof. It should be noted that the light transmissive dielectric material for the porous substance is selected depending on a particular liquid material used such that the former is not chemically eroded.

While the light transmissive liquid material has been described to be electroosmotically mobile toward a negative electrode, material which electroosmotically moves toward a positive electrode may be used as well.

FIG. 10 shows a structure, in longitudinal section, of a display device of the present invention which is useful for reflection type display, and a power supply system therefor.

In FIG. 10, numeral 1110 denotes a glass support plate having an electrode 1120 made of a conductive film such as tin oxide deposited thereon. A film-like black and opaque porous substance 1130 is mounted thereon. The porous substance 1130 has a number of pores 1131 which extend through the porous substrate. Transparent liquid material 1140 is impregnated in the pores. Those elements constitute a composite body 100. On the surface of the porous substance 1130, electrodes 1151 and 1152 made of transparent conductive film are deposited. They are insulated from each other. The electrode 1151 is connected to the electrode 1120 via a conductor 1161 while the electrode 1152 is connected to a D.C. power supply $V_B$ via a conductor 1162.

The porous substance 1130 may be formed by adding mixture of black dye (e.g. oil dye), blue dye (e.g. Bayer Comacrorex blue FR) and red dye (e.g. Kanto Kagaku Co. oil red XO) to synthetic resin such as nitrocellulose, cellulose acetate or mixture thereof, dissolving the mixture into solvent such as acetone and controlling the evaporation rate to form a film-like porous substance, that is, a known microporous membrane filter. Pigment such as carbon black may be added in place of the dye.

The filter has an average pore diameter of 0.1–1 μm.

The liquid material 1140 used is transparent liquid material which is electroosmotically movable in the porous substance 1130.

When nitrocellulose ($n_d=1.51$) is used as the porous substance 1130, dimethyl-triphenyl-trimethoxy siloxane ($n_d \simeq 1.51$) is selected, and when cellulose acetate ($n_d \simeq 1.47$) is used, phenyl-trimethoxy silane ($n_d \simeq 1.47$) is selected, and when mixture of nitrocellulose and cellulose acetate, mixture of the above two liquids is selected to attain the matching of index of refraction.

The electrodes 1151 and 1152 facing the open space 1170 are transparent conductive films which are formed by evaporating copper on the surface of the porous substance 1130 to the thickness of 80 Å and dipping it into iodine solution such as carbon tetrachloride to form cuprous iodide film, or evaporating indium oxide, tin oxide or solid solution thereof to the thickness of 300–900 Å in an oxygen atmosphere of approximately $10^{-4}$ mmHg. In any case, since the film is thinner than the pore diameter of the pores 1131 of the porous substance 1130, the pores 1131 are not clogged by the evaporated film but it remains porous and maintains its liquid permeability.

The light transmissive liquid material 1140 is impregnated in the porous substance 1130 to the extent that the liquid does not overflow onto the surface of the electrodes 1151 and 1152 under zero voltage application. At the portion facing the light transmissive electrode 1151, the light transmissive liquid material 1140 is impregnated up to a level of the exposed surface of the porous substance 1130 by capillary action because no voltage is applied across the electrodes 1151 and 1120.

Accordingly, since the indexes of refraction of the liquid material 1140 and the dielectric material (synthetic resin) forming the porous substance 1130 are substantially equal and match to each other, an external light $L_1$ is not reflected at the contact interface but it transmits therethrough and is absorbed by the black dye or pigment in the porous substance 1130. As a result, that portion appears black.

On the other hand, at the portion facing the electrode 1152, a D.C. voltage is applied across the electrodes 1152 and 1120 so that the electrode 1120 is charged negatively. As a result, the liquid material 1140 electroosmotically moves toward the negative electrode 1120 and the excess liquid flows into a gap 1180 between the porous substance 1130 and the electrode 1120. Accordingly, the impregnation factor of the liquid material 1140 at the surface under the electrode 1152 which faces the open space 1170 is reduced to create voids 1131 as shown. Since air exists in the voids 1131, it causes mismatching of index of refraction between the synthetic resin forming the porous substance 1130 and the voids so that the external light $L_1$ is reflected at the interface to produce a reflected light $L_2$. The higher the voltage $V_B$ is, the lower is the liquid impregnation factor and the stronger is the intensity of the reflected light and hence the whiter does the portion facing the electrode 1152 appear. When the voltage $V_B$ is reduced to zero, the condition of the portion facing the electrode 1151, that is, black condition is instantly restored.

Therefore, by increasing the number of the light transmissive electrodes 1151 and 1152 which face the open space and replacing them with known seven-segment electrodes and selectively applying a D.C. voltage across the electrode 1120, a reflection type numeric display device can be provided.

Instead of replacing the electrodes facing the open space with the seven-segment electrodes, the electrode 1120 on the support plate 1110 may be replaced with the seven-segment electrodes and a voltage may be selectively applied thereto to attain the same operation.

The electrodes 1120 may be made of thin and liquid permeative conductive film such as cuprous iodide or tin oxide, like the electrodes 1151 and 1152 and it may be deposited on the surface of the porous substance 1130 which is opposite to the surface facing the electrodes 1151 and 1152. In this case, the support plate 1110 may be omitted and both surfaces of the porous substance 1130 are exposed to the open space.

Accordingly, in the display device of the present invention, one or both surfaces, or in other word at least one surface of the porous substance need be exposed to the open space.

FIG. 11 shows a partial structure, in longitudinal section, of another embodiment of the present invention, and a power supply system therefor. Numeral 1230 denotes porous substance made of cellulose acetate which is colored by black dye or pigment like in the embodiment of FIG. 10. It may be a black microporous membrane filter having a thickness of 120 μm and having fine circular through-holes having an average pore diameter of 0.5 μm and porosity of approximately 80%.

Liquid material 1240 may be a mixture of methacryloxy-propyl-trimethoxy silane ($n_d = 1.43$) and α-methylnaphthalene ($n_d = 1.62$). These are mixed at an appropriate proportion to attain an index of refraction which is approximately equal to that of cellulose acetate ($n_d = 1.47$) to attain matching of index of refraction.

Those elements are mounted on a glass support plate 1210 on which electrodes 1221 and 1222 made of tin oxide conductive films having an electrode width of 300 μm are deposited alternately with a space of 100 μm between adjacent electrodes. The electrodes 1221 and 1222 are connected to a square wave A.C. power supply 1290 via conductors 1261 and 1262, respectively. The liquid material 1240 is transparent and electroosmotically moves in the porous substance 1230 toward a negative electrode.

FIG. 11 diagramatically shows the movement of the liquid material when the electrode 1221 is negatively charged relative to the electrode 1222.

Since the liquid material 1240 moves toward the negative electrode 1221, the liquid impregnation factor at the positive electrode 1222 is lowered and that portion diffuse-reflects an external light. As a result, it appears white.

On the other hand, when the polarity of the applied voltage is reversed, the portion on the electrode 1221 appears white. It appears white alternately as the polarity of the voltage from the power supply 1290 alternates. As a result, an average light reflection factor is increased. This trend is more remarkable as the magnitude of the voltage increases. When no voltage is applied, the external light is absorbed by the black porous substance 1230 and hence that portion appears black. Thus, the average light reflection factor can be controlled by the voltage application.

A response of electroosmotic movement to the applied voltage is fast. In the embodiment of FIG. 11, the device can respond up to approximately 800 Hz if the voltage is appropriately high.

A satisfactory reflection type display is attained when the frequency of the A.C. square wave from the power supply 1290 is selected to approximately 60 Hz taking a flicker problem into consideration and the amplitude is varied from 0 volt to 150 volts.

In the illustrated embodiment, the liquid material 1240 is rendered to electroosmotically move in parallel to the surface of the porous substance 1230. Accordingly, the pores of the porous substance need not necessarily extend from one surface to the other surface but it may be sufficient that only the surface portion facing the open space need be porous.

While black-white display has been explained above, white-non-white display can be attained if oil soluble non-white dye or pigment issued as the color agent for the porous substance.

For example, when Bear Co. macrorex blue FR is used as the color agent for the porous substance, white-blue display is attained, and when Kanto Kagaku Co. oil red XO is used, white-red display is attained.

As described above, the present invention provides a reflection type display device which utilizes the electroosmotic movement of the light transmissive liquid material in the opaque or colored porous substance. Unlike a prior liquid crystal device, it has no severe limitation on the operation temperature and is operable over a wide temperature range of $-30°$ C. $--100°$ C. Also, no complex orientation process is required. Thus, the present invention readily permits to attain a stable and wide-area reflection type display device.

FIG. 12 shows a structure, in longitudinal section, of a display device of the present invention which is particularly useful for the reflection type display, and a power supply system therefor.

In FIG. 12, numeral 2110 denotes a glass support plate on which lustrous metal 2200 such as evaporated aluminum film is deposited. An electrode 2120 made of a transparent conductive film such as tin oxide is deposited thereon. Porous substance 2130 made of film-like transparent dielectric material is displaced thereon. The porous substance 2130 has a number of fine circular through-holes or pores 2131 into which transparent liquid material 2140 having an index of refraction which is approximately equal to that of the dielectric material mentioned above is impregrated. Those elements constitute a composite body 100.

Electrodes 2151 and 2152 made of transparent conductive films such as tin oxide or indium oxide are deposited on the surface of the porous substance 2130. Those electrodes are insulated from each other and the electrode 2151 is connected to the electrode 2120 via a conductor 2161 while the electrode 2152 is connected to a D.C. power supply $V_B$ via a conductor 2162. Numeral 2300 denotes a circular polarization plate. The porous substance 2130 may be a known microporous membrane filter made of light transmissive dielectric material such as nitrocellulose, cellulose acetate or mixture thereof. The filter has fine holes or pores having an average pore diameter of 0.1–1 μm. The pores have openings exposed to the surface of the porous substance and they substantially extend from one surface to the other surface of the porous substance.

It is particularly preferable that the porous substance 2130 has holes or gaps which substantially extend from one surface to the opposing surface, like that of the present embodiment, but the holes or gaps need not necessarily extend through the porous substance so long as they have openings at least the surface of the porous substance which is exposed to the open space.

The light transmissive liquid material 2140 used is light transmissive, preferbly transparent, liquid material which is electroosmotically mobile in the porous substance 2130.

Useful examples of the porous substance 2130 made of cellulose resin or glass are; monosilane having at least one of alkyl group and alcoxy group as a functional group such as phenyl-trimethoxy silane [$C_6H_5Si(OCH_3)_3$]; and dimethyl-triphenyl-trimethoxy siloxane

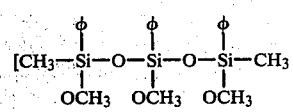

[where φ represents phenyl group]. Generally, those materials electroosmotically moves toward a negative electrode. The indexes of refraction of the dielectric material forming the porous substance and the liquid material are made to be approximately equal.

When nitrocellulose ($n_d = 1.51$) is used as the porous substance 2130, dimethyl-triphenyl-trimethoxy siloxane ($n_d \simeq 1.51$) is selected, and when cellulose acetate ($n_d \simeq 1.47$) is used phenyl-trimethoxy silane ($n_d \simeq 1.47$) is selected; and when a mixture of nitrocellulose and cellulose acetate is used a mixture of the two liquids described above is used to attain the matching of index of refraction.

The electrodes 2151 and 2152 which face the open space 2170 are evaporated by cold sputter method. They are very thin, e.g. in the order of 200–500 Å. As a result, the pores 2131 are not clogged by those evaporated films and the porous substance remains porous and liquid permeative.

The light transmissive liquid 2140 is impregnated into the porous substance 2130 to the extent that the liquid material does not overflow onto the surfaces of the electrodes 2151 and 2152 under zero voltage application. At the portion facing the light transmissive electrode 2151, the light transmissive liquid material 2140 is impregnated to a level of the exposed surface of the porous substance 2130 by capillary action because no voltage is applied across the electrodes 2151 and 2120.

Accordingly, an external light $L_1$, after having transmitted through the circular polarization plate 2300, transmits through the composite body 100 without being reflected by a contact interface of the liquid material 2140 and the porous substance 2130 because the indexes of refraction of the dielectric material forming the porous substance 2130 and the liquid material 2140 are approximately equal. The transmitted light is then reflected by the brilliant metal 2200 to produce transmitted reflected light $L_{2T}$.

Since the external light $L_1$ has transmitted through the circular polarization plate 2300, it is circularly polarized. The reflected light $L_{2T}$ from the lustrous metal 2200 has opposite rotation of circular polarization. That is, assuming that the circular polarization plate 2200 imparts clockwise circular polorization, the transmitted reflected light $L_{2T}$ has counterclockwise polarization. As a result, the transmitted reflected light $L_{2T}$ is blocked by the circular polarization plate 2300 and absorbed thereby. As a result, the portion facing the light transmissive electrode 2151 appears black when viewed from a view point 2400.

On the other hand, the D.C. voltage $V_B$ is applied across the electrodes 2152 and 2120 with the electrode 2120 being charged negatively. Thus, the liquid material 2140 electroosmotically moves toward the negative electrode 2120 and the excess liquid material flows into a gap 2180 between the porous substance 2130 and the electrode 2120. As a result, the impregnation factor of the liquid material 2140 at the surface portion facing the electrode 2152, which faces the open space, is reduced and voids 2131 are created as shown. Since air exists in the voids 2131, it creates mismatching of index of refraction between the air and the synthetic resin forming the porous substance 2130. As a result, the external light $L_1$ is diffuse-reflected at the interface to produce a reflected light $L_{2R}$. The higher the voltage $V_B$, the more is the liquid impregnation factor reduced and the more does the intensity of the reflected light $L_{2R}$ increases.

Since the reflected light $L_{2R}$ is the one from the surface of the porous substance 2130, the rotation of circular polarization is not reversed. Accordingly, the reflected light $L_{2R}$ can freely transmits through the circular polarization plate 2300 without being blocked thereby.

The higher the voltage $V_B$, the whiter does the portion facing the electrode 2152 appear.

As described above, the present invention makes use of the finding that the reversal of rotation of circular polarization takes place at the brilliant metal 2200 even after the light has transmitted through the composite body 100 but the reversal of rotation of circular polarization does not take place by the reflection at the surface of the porous substance 2130.

A black level can be materially lowered by appropriate choice of the circular polarization plate 2300. Thus, unlike a liquid crystal device, a wide view angle and high quality black-white reflection type display is attained.

By reducing the voltage to zero, the portion facing the electrode 2152 instantly restores to the same state as the portion facing the electrode 2151, that is, the black state, by the capillary action.

Thus, by increasing the number of the light transmitting electrodes 2151 and 2152 exposed to the open space and replacing them with known seven-segment electrodes insulated from each other and selectively applying the D.C. voltage between them and the electrode 2120, a reflection type numeric display is provided.

In place of replacing the electrodes exposed to the open space 2170 with the seven-segment electrode, the electrode 2120 facing the support plate 2110 may be replaced with the seven-segment electrodes and the voltage may be selectively applied thereto to attain a similar operation.

The electrode 2120 and the lustrous metal 2200 may be made of thin and liquid permeative conductive films such as indium oxide or tin oxide like the electrodes 2151 and 2152 and they may be deposited on the surface of the porous substance 2130 opposite to the surface facing the electrodes 2151 and 2152. In this case, the support plate 2110 may be omitted and the both surfaces of the porous substance 2130 are exposed to the open space.

Accordingly, in the display device of the present invention it is sufficient that one or both of the surfaces and hence at least one surface of the porous substance need be exposed to the open space.

FIG. 13 shows a partial structure and power supply system, in longitudinal section, of another embodiment of the reflection type display device of the present invention. Numeral 2130 denotes, like in FIG. 12, porous substance made of cellulose acetate which serves as the light transmissive dielectric material. It may be a microporous membrane filter having a thickness of 120 μm and having fine through-holes or pores having average pore diameter of 0.5 μm and porosity of approximately 80%.

The liquid material 2140 may be a mixture of methacryloxy-propyl-trimethoxy silane ($n_d=1.43$) and α-methyl naphthalene ($n_d=1.62$). They are mixed at an appropriate proportion to obtain an index of refraction which is approximately equal to the index of refraction of cellulose acetate ($n_d=1.47$).

Those elements may be mounted on a glass support plate 2110 on which electrodes 2121 and 2122 made of tin oxide conductive films having electrode width of 300 μm are deposited alternately with a space between adjacent electrodes being 100 μm. The electrodes 2121 and 2122 are connected to a square wave or sinusoidal wave A.C. power supply 2190 via conductors 2161 and 2162, respectively. The liquid material 2140 is transparent and electroosmotically moves toward a negative electrode in the porous substance 2130.

FIG. 13 diagramatically show the movement of the liquid material when the electrode 2121 is negatively charged relative to the electrode 2122.

In the present embodiment, the lustrous metal member 2200 is made of a metal plate such as aluminum plate and it is disposed to expose to the open space 2170 and to be away from the composite body 100, as opposed to the embodiment of FIG. 12. The circular polarization filter 2300 is deposited on the surface of the transparent glass support plate 2110. An external light $L_1$ is radiated from the lower side of the circular polarization plate 2300 and a view point 2400 exists on the same side of the circular polarization plate 2300.

Since the liquid material 2140 moves toward the negative electrode 2121, the external light $L_1$ which has transmitted through the circular polarization plate 2300 transmits through the portion of the composite body 100 facing the negative electrode 2121, and the transmitted light is reflected by the brilliant metal member 2200 to produce transmitted reflected light $L_{2T}$ having reversed rotation of circular polarization as a result, that portion appears black.

On the other hand, the liquid impregnation factor of the surface portion of the composite body 100 facing the positive electrode 2122 lowers. Thus, reflected light $L_{2R}$ is produced thereat. As a result, no reversal of the rotation of circular polarization takes place and the reflected light transmits through the circular polarization filter 2300. Therefore, that portion appears white.

When the polarity of the voltage is reversed, the portion on the electrode 2121 appears white. That portion thus alternately appears white in response to the polarity reversal of the voltage from the power supply 2190. As a result, an average light reflection factor increases. This trend is more remarkable as the magnitude of the voltage increases. When no voltage is applied, it appears black as explained with reference to FIG. 12. Thus, the average light reflection factor can be controlled by the voltage application.

A response of the electroosmotic movement to the application of voltage is fast and the device shown in FIG. 13 can respond up to approximately 800 Hz if an appropriately high voltage is applied.

A satisfactory reflection type display is attained by selecting the frequency of the alternating square wave from the power supply 2190 to approximately 60 Hz, taking flicker problem into consideration, and varying the amplitude from 0 volt to 150 volts.

In the present embodiment, the liquid material 2140 is rendered to electroosmotically move in parallel to the surface of the porous substance 2130. Accordingly, the pores in the porous substance need not necessarily extend from one surface to the other surface but it is sufficient that only the surface portion exposed to the open space 2170 is porous.

The lustrous metal member 2200 may be disposed on the glass support plate 2110 and the circular polarization plate 2300 may be disposed to expose to the open space. In this case, the view point 2400 and the radiation source of the external light $L_1$ exist in the open space 2170. When the electrodes 2121 and 2122 are made of metal electrodes such as aluminum evaporated electrodes, the brilliant metal member 2200 which is to be mounted on the surface of the support plate 2110 can be omitted. In this case, light transmissive conductive films such as indium oxide or tin oxide may be deposited on the electrodes 2121 and 2122 made of metal evaporated films.

FIG. 14 shows a structure, in longitudinal section, of a further embodiment of the reflection type display device of the present invention, and a power supply system therefor. The present embodiment intends to further enhance a contrast ratio to compare with the two previous embodiments.

On the surface of the porous substance 2130, there are provided a number of depressions 2132 of spot, line or rectangular shape or mixture thereof, which extend to include a number of pores of the porous substance 2130.

For example, when the porous substance 2130 has pores having an average pore diameter of 0.1-1 μm, an opening of the depression 2132 exposed to the open space may have a width or diameter of 15-30 μm, a depth of 15-30 μm and a width or diameter of tip end of 3 μm or less. It has pedestal or trirangle shape in cross section and density of the depressions is 150-400 per inch.

Display electrodes 2151 and 2152 of conductive films made of light transmissive and liquid permeative metal oxide are deposited on the surface of the porous substance 2130 including the inner surfaces of the depression.

A brilliant metal member 2200 which also serves as an electrode is deposited on a support plate 2110 made of glass, plastics or the like.

Since no voltage is applied across the electrodes 2151 and 2200, the light transmissive liquid material 2140 wets the sloped surfaces of the depressions 2132 by capillary action. As a result, an external light $L_1$ which has been circularly polarized at a circular polarization plate 2300 transmits through the portion facing the electrode 2151 and it is reflected at the lustrous metal member 2200 which also serves as the electrode. Thus, the rotation of circular polarization is reversed and that portion appears black when viewed from a view point 2400.

On the other hand, the liquid material 2140 at the portion facing the electrode 2152 electroosmotically moves toward the electrode 2200 so that the liquid impregnation factor at the sloped surfaces of the depressions 2132 is lowered and the openings of the pores of the porous substance 2130 are exposed.

As a result, the external light $L_1$ is diffuse-reflected and the reflected light transmits through the circular polarization plate 2300. Thus, that portion appears white.

The provision of the depressions 2132 is very effective to the diffused reflection of light and permits high quality black-white display.

For example, when the porous substance as described above having a thickness of 40-120 μm and the light transmissive liquid material are used, a black-white ratio of over 1:20 can be attained at an operating voltage of 10-60 volts.

In the present embodiment, when the support plate 2110 is made of metal plate such as aluminum plate, it may serve as both the electrode and the lustrous metal member.

In order to prevent electrochemical reaction of the support plate, a light transmissive conductive film such as tin oxide or indium oxide may be deposited on the surface thereof. The same film may also be applied to the lustrous metal member 2200 which also serves as the electrode.

In the embodiment of FIG. 14, the lustrous metal member 2200 may be mounted on the surface of the glass support plate 2110 which is opposite to the surface facing the composite body 100 and the light transmissive electrode made of metal oxide may be disposed at the original location of the member 2200.

Opaque ink or conductive ink of black or other color may be selectively applied on the light transmissive electrodes 2151 and 2152 leaving the depressions 2132 uncovered. When the conductive ink is applied, the light transmissive electrodes 2151 and 2152 may not be deposited but instead the conductive ink may be selectively applied on the surface of the porous substance 2130 while leaving the depressions uncovered. In this case, there is an advantage that since no electrode exists in the depressions, pure white display can be attained.

When a light transmissive electrode is deposited on the surface of the transparent support in place of the lustrous metal member 2200, the circular polarization plate 2300 may be disposed on the surface of the support plate 2110 which is opposite to the surface facing the composite body 100 and the lustrous metal member 2200 may be disposed to expose to the open space 2170.

As described above, the present invention provides a reflection type display device by the use of the circular polarization plate and the lustrous metal member. Unlike a prior liquid crystal display device, it has a wide view angle, a wide display area and a wide range of operation temperature.

FIG. 15 shows a structure, in longitudinal section, of one embodiment of an improved display structure which is particularly useful for a transmission type display device.

The display device comprises porous substance having a number of five openings which open to at least one surface thereof and depressions each including more than one of the openings therein. Liquid material is impregnated in the display structure. By electrically controlling the liquid impregnation factor at the surface having the depressions, an effective control of external light is attained by the generation of the depression. The depressions may be any one of variety of shapes, such as dot line, strip or radial dot where a plurality of short lines radially extend from a center dot, a plurality of depressions are arranged adjacent to each other. When the porous substance is made of transparent dielectric material and transparent liquid material having an index of refraction which is approximately equal to that of the transparent dielectric material is impregnated therein and a voltage of an appropriate pattern is applied to the structure, it is particularly useful for the transmission type display device for numerics, characters, graphic patterns and picture images.

An effective control of light transmission is attained by the depressions. Accordingly, it is necessary to increase a density of the depressions in order to obtain a high contrast ratio required for the display device. However, available manufacturing technique poses a limit to the increase of density of depressions and the contrast ratio of the entire device is restricted by the leakage of transmitted light from flat portions of the display device between the adjacent depressions.

The present embodiment is intended to improve the contrast ratio by making the surface of the porous substance substantially opaque when it is impregnated with the liquid material while leaving the depressions transparent.

In FIG. 15, numeral 1000 denotes a display device having a film-like porous substance 3110, on a surface of which a number of conical or truncated conical dot-shaped depressions 3120 are formed.

The porous substance 3110 may be a microporous membrane filter made of light transmissive dielectric material such as nitrocellulose, cellulose acetate or mixture thereof. It has a thickness of 40-200 μm and pores having an average pore diameter of 0.1-1 μm and porosity of 50-80% and extending from one surface to the other surface and having openings exposed to both surfaces.

The depressions 3120 may be dot-shaped and they may be formed by an emboss process in which a copper mesh relief for relief printing is pressed or hot-pressed to a microporous membrane filter which forms the porous substance. The dot-shaped depressions 3120 may have an average opening diameter of 15–30 μm at the surface, a depth of 10–15 μm and an average diameter of no larger than 3 μm at the bottom of the depression. Space between adjacent depressions 3120 may be 254 μm (100 depressions/inch)-63.5 μm (400 depressions/inch) and a number of depressions are formed at this density.

In the present embodiment, like e.g., the embodiments of FIGS. 5 and 7, the light transmissive electrodes are arranged on the support plate with each electrode being insulated from other and a voltage is applied across the electrodes to attain a transmission type display. A plurality of depressions 3120 are provided at an area in which the control of light transmission is desired and no depression is provided at a non-display area 3130'.

In FIG. 15, opaque forming agent 3140 is applied on flat surface portions 3130 between the depressions 3120 and on the non-display area 3130', and liquid material is impregnated in the display structure 1000 so that it appears substantially opaque.

One example of the opaque forming agent 3140 is opaque ink such as black ink and another example is oil expelling agent such as surface active agent having smaller surface tension than the impregnated liquid material.

A requirement for the opaque ink is that coloring agent and binder are not dissolved by the light transmissive liquid material impregnated. The liquid material usually made of silane, siloxane or naphthalene derivative having alkyl group or alcoxy group as a functional group. Accordingly, the opaque coloring agent may be coloring dye or pigment if it is properly selected, but fine particles of carbon black are most preferable. Major binder may be cellulose ester such as nitrocellulose or cellulose aetate.

Preferable solvent for nitrocellulose is butyl carbitol and preferable solvent for cellulose acetate is N-methyl-2-pyrrolidon. Carbon black is mixed with the solvent to form opaque ink.

The porous substance 3110 is usually made of cellulose ester material as described above. As a result, when the opaque ink described above is applied thereon, the surface of the porous substance 3110 may be eroded or dissolved by the solvent so that the display structure may frequently be deformed or shrink.

Accordingly, most preferable opaque ink is that including solvent which does not dissolve the porous substance 3110 and major binder which is not eroded by the liquid material.

It has been found that most preferable solvent for the above requirement is alcohol and most preferable major binder is polyamid resin. A very small amount of solvent which dissolves the porous substance 3110 may be added to enhance application strength.

Nitrocellulose, cellulose acetate or mixture thereof is not substantially eroded by alcohol solvent, and polyamid resin is not substantially eroded by the liquid material mentioned above.

From a standpoint of printing ability, opaque ink including solvent consisting of mixture of hepti-alcohol and octi-alcohol, and mixture of polyamid resin and carbon black can be widely used, not only for cellulose ester resin but also glass or ceramic material.

On the other hand, requirement for the oil expelling agent is that it is not chemically eroded by the liquid material used and the porous material 3110 is not eroded by diluent for the oil expelling agent. When the porous substance 3110 is made of cellulose ester and the liquid material 3400 is made of the material mentioned above, carbon fluoride anion or cation surface active agent may be used but it is not good in electrochemical action.

Most preferable oil expelling agent is fluorine polymer dissolved in solvent such as xylenehexa-floride or fleon solvent; e.g. poly-111, 111-pentadecafluorooctyl-methacrylate. This polymer film has very low surface tension, e.g. 11 dyne/cm. It has hydrophobic property and strong oil expelling property, it does not dissolve almost all solutions and the solvent mentioned above does not dissolve cellulose ester.

The application agent described above is commercially available from 3M Co. under the trade name of FC-706 or FC-721. When the polymer solution described above is applied on the flat surface portions or land surface portions 3130 between the depressions 3120, and the non-display area 3130', a portion of the polymer solution is impregnated into the porous substance 3110 by a small depth from the surface thereof through fine openings which present at the surface of the porous substance 3110. When the solvent is dried and evaporated at approximately 60° C., the polymer deposit on the surface of the porous substance and inner surfaces of the pores at small depth from the surface. Thus, strong oil expelling property is attained.

When the liquid material has been impregnated into the display structure 1000 thus formed, the land surface portions 3130, the non-display area 3130' and the vicinity thereof are not wetted by the liquid material. Accordingly, those portions create mismatching of index of refraction and they scatter and diffuse-reflect an external light. Therefore, they are substantially opaque to transmitted light.

When the opaque ink mentioned above is applied, the land surface portions 3130 and the non-display area 3130' are of course opaque and light is not transmitted therethrough.

A special manufacturing process is required for precisely applying the opaque forming agent 3140 on the limited areas, that is, small land surface portions 3130 and the non-display area 3130'.

Figure 16A:
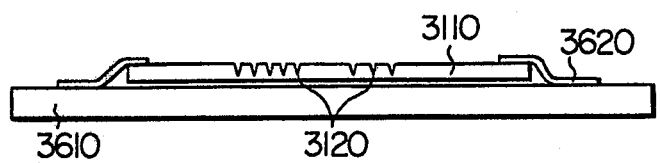
FIGS. 16A and 16B show process for manufacturing the display structure.
Figure 16B:
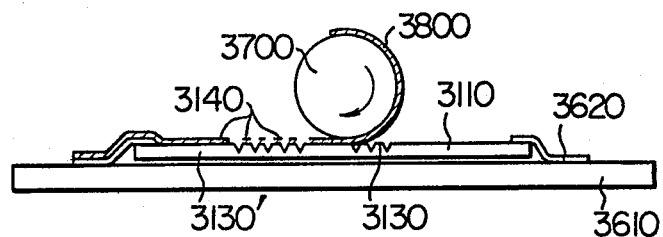

FIGS. 16A and 16B show manufacturing process of the display structure of the present invention in association with FIG. 15.

In FIG. 16A, numeral 3110 denotes a microporous membrane filter made of cellulose ester on the surface of which desired depressions 3120 of dot, line, strip or radial dot shape are provided at predetermined positions by embossing method. The porous substance 3110 is disposed on a flat support plate 3610 such as glass plate and the opposite ends of the porous substance 3110 are fixed to the support plate 3610 by adhesive tape 3620 made of plastic or the like.

Then, as shown in FIG. 16B, solution 3800 of opaque forming agent such as opaque ink or oil expelling agent is applied onto a printing roll 3700 made of rubber as thin as possible and roller coating is carried out rapidly before the solvent evaporates. This process is repeated several times. The solution 3800 on the roll 3700 is transferred to the land surface portions 3130 and the non-display area 3130' while leaving the depressions 3120 uncoated. Hardness of the roll is an important factor to carry out such precise transfer. If it is too soft, the solution 3800 is applied to the interior of the depressions 3120 and if it is too hard the porous substance 3110 is damaged or uniform transfer is not attained. A preferable roll is a rubber roll having hardness of 30 degrees.

While manually operated roller coating has been explained above, offset printing by a printer may be used for mass production. The porous substance 3110 having the opaque forming agent 3140 applied thereto is then heated to approximately 60° C. to evaporate the solvent thereof. Then, the tape 3620 is removed and unnecessary portions of the porous substance is cut away to obtain the display structure 1000 as shown in FIG. 15. By evaporating the solvent by heat treatment after the opaque forming agent 3140 has been applied, the applied opaque forming agent 3140 can be effectively made porous.

Figure 17:
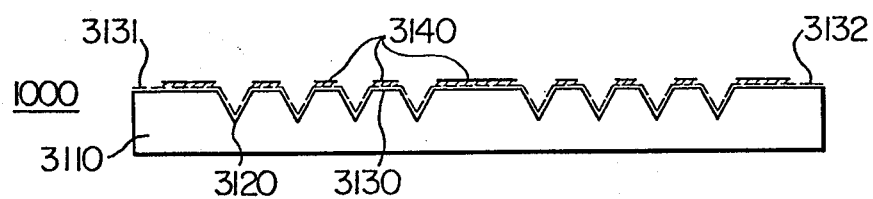
FIG. 17 shows a structure, in section, of another embodiment of the display structure of the present invention.

FIG. 17 shows a structure, in longitudinal section, of another embodiment of the display structure of the present invention, which is comparative to that shown in FIG. 1. It is useful for a transmission type display device in which a voltage is applied thicknesswise of the composite body, like the display device shown in FIG. 12.

The present embodiment differs from that of FIG. 15 in that light transmissive and liquid permeative electrodes 3131 and 3132 are deposited on the land surface portions 3130 and the non-display area and opaque forming agent 3140 is applied on the electrodes 3131 and 3132 while leaving feeding ports thereof uncovered.

In the present embodiment, desired depressions 3120 are formed in the porous substance 3110 by embossing method, copper is evaporated on the surface of the porous substance 3110 through an evaporation mask to the thickness of approximately 80 Å and then the porous substance 3110 is dipped in iodine solution to form the light transmissive and liquid permeative electrodes 3131 and 3132 of cuprous iodide. Then, opaque forming films 3140 are applied in the same way as explained in FIG. 16 to form the display structure 1000.

Light transmissive liquid material having substantially same index of refraction as the dielectric material forming the display structures of FIGS. 15 and 17 is impregnated into those display structures to form the display devices having the electrode structures as shown in FIGS. 5 and 1, respectively. By the application of the opaque forming agent 3140, light transmission through the land surface portions 3130 and the nondisplay area 3130' is effectively blocked and the contrast ratio by voltage control is remarkably enhanced and white image display on black background is attained.

As an example, when the display structure as shown in FIG. 17 is used and the electrode structure as shown in FIG. 1 in which a voltage is applied thicknesswise of the composite body is used with the porous substance 3110 made of a microporous membrane filter made of nitro-cellulose having a thickness of 120 μm and an average pore diameter of 0.3 μm and depressions 3120 of truncated cone shape having an opening diameter at the top surface of 20-30 μm, a depth of approximately 1.7 μm and average diameter at the bottom of 3 μm or less, arranged at a density of 200 depressions per inch, and the light transmissive liquid material made of dimethyl-trimethoxytriphenyl siloxane, and a voltage $V_B$ of 100-150 volts is applied, the strength of transmitted projected light is reduced to 1/5-1/20 of the light intensity for the applied voltage $V_B$ of zero volt (that is, contrast ratio is 1/15-1/20) when the opaque forming agent 3140 made of the opaque ink or oil expelling agent described above is applied. Thus, the effect of the application of the opaque forming agent 3140 is very remarkable and the contrast ratio is materially improved. When the opaque forming agent 3140 is not applied, a dark pattern corresponding to the depressions 3120 is displayed in a bright background, while when the display structure 1000 of the present invention is used a light pattern is displayed on a black background.

While the porous substance made of cellulose ester has been explained, a similar display structure can be provided when the porous substance is made of glass, ceramics or metal oxide.

While the depressions of dot shape have been particularly explained, they may be of line, strip or any other shape. When the depressions are parallel grating or strips, the opaque forming agent may be applied along the lines of the parallel grating or strips by roll coating or offset printing method to precisely coat the opaque forming agent without coating the depressions.

As described above, the display structure of the present invention comprises the porous substance having depressions with the surface thereof being made substantially opaque except the depressions. It blocks the light transmission through the areas between the depressions and hence materially improves the contrast ratio.

The display device which employs the display structure described above controls the liquid impregnation factor at the depressions by electroosmotic movement to effectively control a light transmission factor or light reflection factor to an external light. By making the surface of the porous surface selectively opaque excluding the depressions, undesired light transmission and light reflection are blocked and hence a display device of high contrast ratio is provided.

The depressions may be of dot, line, strip or any other shape having a cross section which becomes narrower as it goes depthwise of the porous substance. A plurality of depressions are provided side by side.

The porous substance may be light transmissive, opaque or colored made of dielectric material, and the liquid material impregnated therein is preferably light transmissive and when light transmissive dielectric material is used, liquid material having substantially the same index of refraction as the dielectric material is selected. When the porous substance is made of light transmissive dielectric material, the device is useful for light transmission type, transmission-projection type or reflection type display device, and when the porous substance is made of opaque or colored dielectric material the device is useful for a light reflection type display. The porous substance may be made of plastics, glass, ceramics or metal oxide having a number of fine openings which expose to at least one surface of the porous substance and having pores or gaps which permit the impregnation of liquid to at least the interior of the porous substance which is deeper than the depth of the depressions formed in the porous substance.

The porous substance usually comprises a microporous membrane filter made of cellulose ester which permits liquid to permeate from one surface thereof to the other. Accordingly, from the view point of heat resistivity of this membrane, liquid permeative and light transmissive conductive film may be formed by vacuum depositing copper and iodizing it by iodine solution to form cuprous iodide.

In order to maintain the liquid permeability and to prevent the fine openings on the surface of the porous surface from being clogged and to maintain high light transmission factor, the cuprous iodide conductive film is usually formed in this thickness such as 80 Å.

The display structure described above, however, still has problems to be resolved.

The first problem is sheet resistance of the liquid permeative and light transmissive conductive film. For example, sheet or areal resistance of the conductive film made of cuprous iodide is as high as 10 k$\Omega/\square$, which is too high to use it as an electrode of a wide screen display device. Also, the conductive film may be easily broken during the operation.

Second problem is decrease of light transmission at the depressions. In a transmission-projection type display device, the dielectric material forming the porous substance and the liquid material impregnated therein are to be transparent and have the substantially same index of refraction. As a result, when no voltage is applied, the depressions are transparent and exhibit high light transmission factor. However, when the conductive film of cuprous iodide is provided, the light transmission factor is lowered due to mismatching of index of refraction and the projected image appears brown. For example, when the porous substance is made of cellulose ester it has an index of refraction between 1.47–1.51 while cuprous iodide has a high index of refraction of approximately 2.34. Therefore, there exists large mismatching of index of refraction.

In the light of the above, the present invention is intended to provide a display structure and a display device which have resolved the first and second problems.

The display structure is constructed by selectively applying and depositing electrodes made of conductive ink on the surface of the porous substance while leaving the depressions uncovered. The display device is constructed using the display structure thus formed.

One embodiment thereof will be explained with reference to FIG. 18 which shows a partial perspective view of the display structure of the present invention. For the convenience of illustration, the ink applied and deposited is shown as a laminate although it is partially impregnated into the surface of the porous substance and the top surface.

Figure 18:
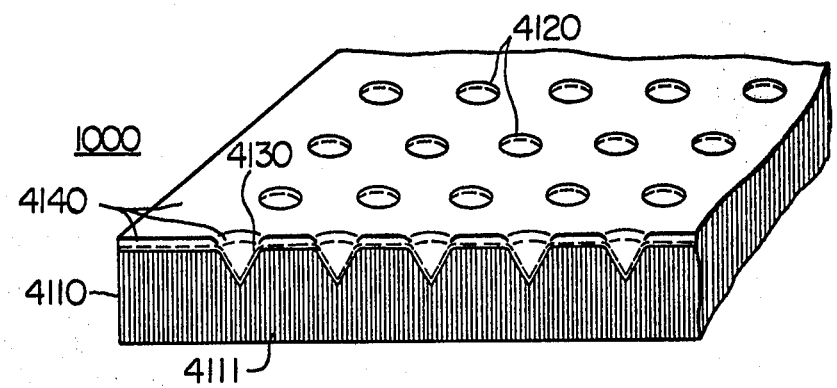
FIG. 18 shows a partial perspective view of an embodiment of the display structure of the present invention.

In FIG. 18, numeral 1000 denotes a display structure having a film-like porous substance 4110 on the surface of which dot-shaped depressions 4120 of conical or truncated conical shape are formed. The porous substance 4110 may be made of fiber such as plastics or glass, or sintered glass or ceramics, and more preferably it is formed by a microporous membrane filter made of mollulose ester such as nitrocellulose, cellulose acetate or mixture thereof. The porous substance 4110 is to be light transmissive material when it is used for a transmission type display device, and black or colored opaque material when it is used for a reflection type display device. The porous body 4110 made of microporous membrane filter has a thickness of 40–200 μm and pores 4111 having an average pore diameter of 0.1–1 μm and substantially extending from one surface to the other surface and having openings exposed to both surfaces of the porous substance, and having a porosity of 50–80%. The dot-shaped depressions 4120 have an average diameter of 15–30 μm at the surface and a depth of 10–25 μm and each depression includes a plurality of pores 4110. An average diameter of the depressions at the bottom end thereof is preferably 3 μm or less to form sharp depressions, in the present embodiment as well as the other embodiments to be described later. A space between adjacent depressions 4120 is 254 μm (100 depressions per inch)—63.5 microns (400 depressions per inch) and a number of depressions are provided.

The depressions 4120 may be formed by embossing method in which a relief printing copper plate is etched to form desired depressions 4120 of dot, line or strip shape and it is pressed or heat pressed to a microporous membrane filter which forms the porous substance 4110.

Copper is then evaporated onto the surface of the porous substance having the depressions 4120 formed thereon, and it is dipped in iodine solution to form a liquid permeative and light transmissive conductive film 4130 to a thickness of approximately 80 Å. An electrode 4140 made of conductive ink is then selectively applied and deposited onto the conductive film 4130 while leaving the depressions 4120 uncovered.

In the display structure of the present embodiment, liquid material made of derivative such as silane, siloxane or naphthalene having at least one of alkyl group and alcoxy group as a functional group is impregnated. Accordingly, the conductive ink 4140 used should be one which is not eroded by such liquid material.

When the porous substance 4110 is made of plastic material such as cellulose ester, it is necessary to prevent it from being dissolved or eroded by solvent (diluent) of the conductive ink.

Taking the above into consideration, major binder for the conductive ink 4140 may be cellulose ester such as nirrocellulose or cellulose acetate, and the most preferable major binder which may be useful for almost all purposes is polyamid resin. Most preferable solvent for the ink is alcohol such as heptyl alcohol or octyl alcohol. As to conductive particles which impose conductivity to the ink 4140, they must be electrochemically stable and make opaque the area other than the depressions 4120. For the effective electrical control of light at the depressions 4120, graphite is most preferable and silver is best with respect to the conductivity.

Accordingly, the conductive particles preferably include at least one of graphite and silver particles. The selective application and deposition of the conductive ink 4140 onto the light transmissive conductive film 4130 while leaving the depressions 4120 uncovered are carried out by repeated process of transferring from a roller having diluted conductive ink applied on the surface thereof and drying of the transferred ink. Sheet resistance of the conductive ink 4140 for the display structure thus formed is 1 $\Omega/\square$ or less for silver conductive particles and 100–200 $\Omega/\square$ for graphite, which are much lower than sheet resistance of 10 k$\Omega/\square$ which is obtained when only the light transmissive conductive film 4130 is used. In this manner, a high performance electrode can be attained.

The electrode 4140 made of conductive ink is opaque. Accordingly, when the display structure 1000 is used in a transmission type display device, the light transmission through the areas other than the depression areas 4120 is blocked. The light transmission is restricted to the depressions 4120 at which effective electrical control is carried out. Accordingly, together with the low resistance and light transmission blocking of the electrode 4140 made of conductive ink, more stable and higher sensitivity display device than the display device using the display structure previously explained is attained. As for the elecrtrochemical stability and the opaque property of the conductive ink 4140 when liquid is impregnated, that including graphite particles as conductive particles is most preferable. So long as the conductivity is concerned, however, that including silver particles is much superior to that described above. In this case, however, if liquid material is not properly selected, that conductive ink tends to be electrochemically eroded. This problem, together with the problem of opaque property, can be resolved by adding graphite particles. Accordingly, the conductive ink preferably includes at least graphite particles with or without silver particles as conductive particles.

Figure 19:
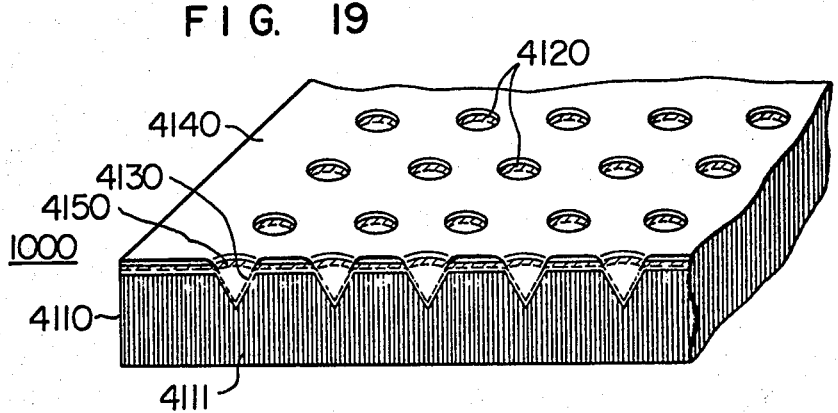
FIG. 19 shows a partial perspective view of another embodiment of the display structure of the present invention.

FIG. 19 shows partial perspective view of another embodiment of the display structure of the present invention. The present embodiment is particularly suitable for use in a transmission type display device. In order to more completely block the light transmission through the areas other than the depressions 4120, opaque ink 4150 is selectively deposited while leaving the depressions 4120 uncovered, and then conductive ink 4140 is deposited thereon. The opaque ink 4150 includes fine particles of carbon black as opaque material, and major binder therefor is most preferably polyamid resin for the same reason as that for the conductive ink 4140 described above. Preferable ink solvent is alcohol such as heptyl alcohol or octyl alcohol. The opaque ink 4150 may be selectively deposited by the transfer from a roller while leaving the depressions 4120 uncovered.

Conductive particles of the conductive ink 4140 are usually those having relatively large grain size in order to increase the conductivity, such as scale-shaped graphite particles having an average grain size of 4.5–10 μm or silver particles having a grain size of 0.2–10μ (peak grain size of 0.5–3μ), or mixture thereof. As a result, when the conductive ink 4140 only is deposited, the light transmission may not be completely blocked. On the other hand, carbon black particles can have small grain size such as 1 μm or less. They have, therefore, much higher shielding ability and light blocking ability. In addition, by the presence of the opaque ink 4150, applicability of the deposition is much more improved than when the conductivity ink 4140 is applied directly on the surface of the light transmissive conductive film 4130, and the light blocking property is also improved by the combined effect with the conductive ink 4140.

Figure 20:
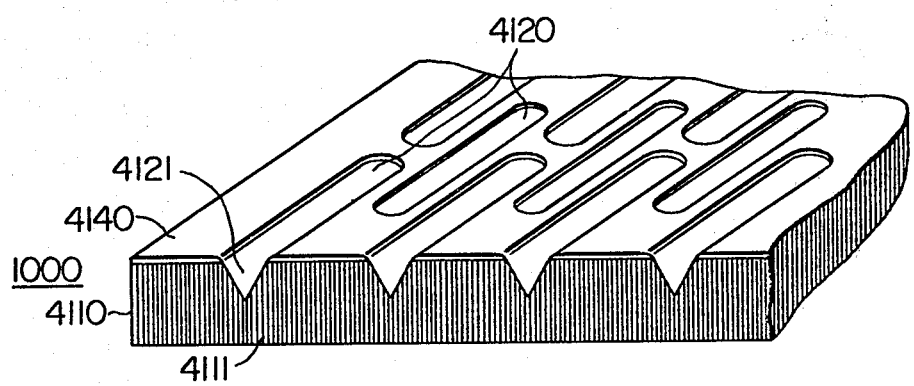
FIG. 20 shows a partial perspective view of a further embodiment of the display structure of the present invention.

FIG. 20 shows a partial perspective view of another embodiment of the display structure of the present invention. Unlike the previous embodiment, the depressions 4120 of the present embodiment do not include the conductive film 4130 described above and the conductive ink 4140 is selectively deposited as the electrode while leaving the depressions 4120 uncovered.

While the strip-shaped depressions 4120 are shown in the illustrated embodiment, they may be of dot shape or line shape (parallel grating) as they are in the embodiments of FIGS. 18 and 19. When they are of strip shape or line shape, openings thereof may have a width of 25–50 μm at the surface, a depth of 20–50 μm and a width of 3 μm or less at the bottom end. When they are of strip shape, the length thereof may be of any length and need not necessarily be uniform. The conductive ink 4140 may be formed in the same manner as in the embodiments of FIGS. 18 and 19. That is, it is selectively transferred and deposited by the transfer from a roller while leaving the depressions 4120 uncovered.

In the present embodiment, like in the embodiments of FIGS. 18 and 19, the display structure 1000 comprises a support plate having an electrode on the surface opposite to the surface on which the conductive ink 4140 is deposited, and liquid material impregnated in the display structure 1000. In operation, a voltage is applied across the conductive ink 4140 and the electrode on the support plate. Although the electrode made of conductive film 4130 is not present in the depressions 4120, the voltage is effectively applied to the interiors of the depressions 4120 by an edge effect of the conductive ink 4140 and the liquid impregnation factor on the sloped surfaces of the depressions is controlled by electroosmotic movement so that the light reflection factor or the light transmission factor can be electrically controlled.

Thus, according to the present embodiment, the manufacture of the display structure can be made easier in comparison with the embodiments of FIGS. 18 and 19 because the light transmissive conductive film 4130 is not needed. In addition, by the use of the conductive ink 4140, a low resistance electrode is provided. Since no conductive film 4140 is present in the depressions 4120, the movement of liquid on the sloped surfaces 4121 is not blocked. Further, the problem of mismatching of index of refraction between the material forming the porous substance 4110 and the liquid material impregnated therein as described above is eliminated. Thus, when a light transmission type display device is constructed by the porous substance 4110 made of transparent dielectric material and the liquid material impregnated therein having the substantially same index of refraction as the dielectric material, the light transmission factor is enhanced and brown coloring can be prevented. As a result, bright and sharp transmitted image can be displayed.

FIG. 21 shows a partial perspective view of another embodiment of the display structure of the present invention, and FIG. 22 shows a structure, in longitudinal section along a line XXII—XXII in FIG. 21, of embodiment of the display device of the present invention which uses the display structure 1000 of FIG. 21.

In the present embodiment, the depressions 4120 are shown as being dot-shaped, but they may be stripshaped or line-shaped (parallel grating). The depressions 4120 are formed only in the areas of patterns of display areas 4141' and 4142'. Opaque ink 4150 is deposited, by the transfer from a roller, on a surface of porous substance 4110 while leaving the depressions 4120 uncovered. Conductive inks 4141 and 4142 are selectively deposited, by the transfer from a roller (offset printing) on the opaque ink 4150 at the areas corresponding to the patterns of the display areas 4141' and 4142' including electrode lead areas 4141' and 4142' while leaving the depressions 4120 uncovered. These are insulated from each other so that a voltage is selectively applied thereto. The display structure 1000 thus formed is mounted on a support plate 4200 made of transparent glass on a surface of which a transparent electrode 4300 such as tin oxide is deposited.

In the embodiment of FIG. 22 which shows a light transmission type display device, the porous substance 4110 may be a microporous membrane filter made of cellulose ester such as nitrocellulose, cellulose acetate or mixture thereof as described above. Electroosmotically mobile liquid material 4400 (which is shown as a number of dots for the convenience of illustration) having the substantially same index of refraction as the material forming the porous substance 4110 is impregnated in the display structure 1000 to attain the matching of index of refraction. When the porous substance 4110 is made of nitrocellulose (index of refraction $n_d \simeq 1.51$), the liquid material 4400 may be dimethyl-triphenyltrimethoxy siloxane

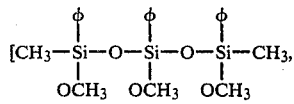

where $\phi$ represents phenyl group] ($n_d \simeq 1.51$), and when the porous substance 4110 is made of cellulose acetate ($n_d \simeq 1.47$), it may be phenyl trimethoxy silane $[C_6H_5Si(OCH_3)_3]$ ($n_d \simeq 1.47$), and when the porous substance 4110 is made of mixture of nitrocellulose and cellulose acetate ($1.41 < n_d < 1.51$), it may be mixture of the liquid materials mentioned above at an appropriate proportion or mixture of high index of refraction material such as α-methyl naphthalene ($n_d \simeq 1.61$) and low index of refraction material such as phenyl trimethoxy silane in order to attain the matching of index of refraction ($1.47 < n_d < 1.51$).

As a result, the porous substance 4110 having the liquid material 4400 impregnated therein becomes to be transparent. Accordingly, at the portions thereof facing the conductive ink 4141 which is connected to the electrode 4300 via a conductor 4501, the liquid material 4400 wets the sloped surfaces 4121' of the depressions 4120 as shown in the drawing by capillary action so that the depressions 4120 transmit an external light $L_1$ to produce a bright transmitted output light $L_{2T}$.

On the other hand, at the portions on which the conductive ink 4142 is applied, a negative voltage $V_B$ is applied to the electrode 4502 via a conductor 4300. In this construction, the liquid material 4400 electroosmotically moves in the porous substance 4110 toward the negative electrode.

Accordingly, the liquid material 4400 on the sloped surfaces 4121'' of the depressions 4120 moves into the interior of the porous substance 4110 as shown in the drawing. As a result, the liquid impregnation factor of the liquid material 4400 on the sloped surfaces of the depressions 4120 lowers accordingly and air comes into the voids to cause mismatching of index of refraction. Thus, by the presence of the sloped surfaces having coarse porosity of porous substance 4110, the input external light $L_1$ scatters and an intensity of transmitted output light $L_{2B}$ decreases. At the areas other than the depressions 4120, the light transmission is blocked by the presence of the opaque ink 4150 and the conductive ink 4142.

Since the transmitted light $L_{2B}$ comes through only the depressions 4120, an effective electrical light control is attained. As an example, in the construction described above, when the porous substance 4110 has a thickness of 120 μm, a contrast ratio $L_{2T}/L_{2B}$ of approximately 20 is obtained at the applied voltage $V_B$ of 100–150 volts. When the voltage $V_B$ is reduced to zero, the sloped surfaces 4121'' are wetted by the capillary action so that those portions instantly restore to the same light transmissive state as the portions facing the conductive ink 4141. When the display structure is to be used in a light reflection type display device, the electrode 4300 may be made light reflective by forming it by aluminum evaporation film. In this case, the portion facing the conductive ink 4141 appears black and the portion facing the conductive ink 4142 appears white due to the scatter and reflection of external light. When the dielectric material forming the porous substance 4110 is made of black or colored material, the portion facing the conductive ink 4141 appears colored in the color of the dielectric material while the portion facing the conductive ink 4142 provides white reflection display.

Figure 23:
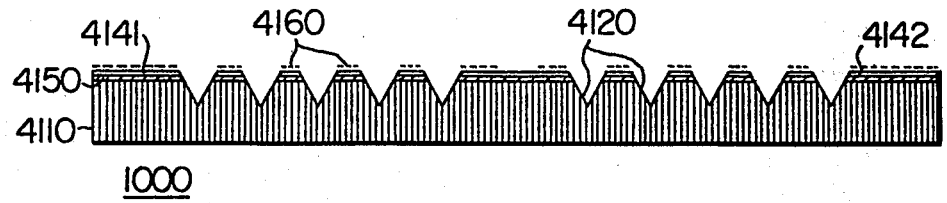
FIG. 23 shows a structure, in longitudinal section, of an embodiment of the display structure of the present invention, which is an improvement over FIG. 21.

FIG. 23 shows a structure, in longitudinal section, of another embodiment of the display structure of the present invention, which is an improvement over the embodiment shown in FIG. 21. Like in FIG. 22, FIG. 23 shows a partial structure in longitudinal section along a line XXII—XXII shown in FIG. 21.

The present embodiment is intended to provide more sharp and uniform display of a desired pattern in the device shown in FIG. 22. It differs from the embodiment of FIG. 21 in that oil expelling agent 4160 (shown by broken lines) is selectively applied on the conductive inks 4141 and 4142 which are selectively deposited while leaving the depressions 4120 uncovered, and on the opaque ink 4150 where no conductive ink is deposited. The requirements for the oil expelling agent 4160 are that it is not chemically and electrically eroded by the liquid material 4400 used, it exhibits high oil expelling property and diluent of the oil expelling agent 4160 does not materially erode the porous substance 4110, opaque ink 4150 and conductive inks 4141 and 4142. When the porous substance 4110 is made of cellulose ester and the liquid material 4400 is made of the material described above, carbon fluoride anion or cation, or neutral surface active agent may be used but they are not necessarily electrochemically strong.

Most preferable material for general purpose is fluorine polymer such as poly-111, 111-pentadecafluoro-octyl-methacrylate dissolved in solvent such as xylenehexafluoride or carbon fluoride (fleon).

As described above, surface tension on the polymer film mentioned above is approximately 11 dynes/cm which is much lower than that of the liquid material 4400. It is hydrophobic and highly oil expelling, and is not dissolved by almost all solutions. The solvent thereof does not dissolve cellulose ester or polyamide resin. By applying the application agent made of the polymer solution mentioned above by roller coating method, for example, and drying the solvent at an appropriate temperature, e.g. 60° C., the display structure 1000 shown in FIG. 23 is obtained.

When the display structure 1000 of FIG. 23 thus formed is used to construct a display device in the same manner as shown in FIG. 22, the flow-out or movement of the liquid material 4400 in the direction along the surface of the display structure having the depressions 4120 is blocked by the presence of the oil expelling agent 4160. As a result, the distribution of the impregnation of the liquid material 4400 which extends over a two-dimensional area is substantially uniform, and a sharp pattern can be displayed with a uniform and stable operation.

When a light transmission type display is constructed, the areas on which the oil expelling agent 4160 is applied are not wetted by the liquid material by the presence of the oil expelling agent 4160 and hence those areas cause mismatching of index of refraction. As a result, the imput external light is scattered and diffuse-reflected so that those areas appear substantially opaque to the light transmission.

Accordingly, the opaque ink 4150 may be omitted and the conductive inks 4141 and 4142 may be directly applied onto the surface of the porous substance 4110 followed by the application of the oil expelling agent 4160. In this case, the oil expelling agent is directly applied onto those areas where the conductive ink are not present.

While two-segment display devices have been shown in FIGS. 21 through 23, a seven-segment display device can be constructed in the same principle to display numerals. In this case, the segments may be selectively applied with pulse voltages in such a polarity that the liquid material 4400 is moved into the interior of the porous substance 4110.

FIG. 24 shows a process for applying the conductive ink, in accordance with the present invention, for the display structures shown in FIGS. 21 and 23.

In FIG. 24A, numeral 4110 denotes a microporous membrane filter made of cellulose ester described above, on the surface of which dot, line or strip-shaped depressions 4120 are formed beforehand by embossing method or the like at predetermined positions in accordance with a predetermined display pattern. Black opaque ink 4150 is applied thereon while leaving the depressions 4120 uncovered. The porous substance 4110 thus formed is mounted on a support plate 4610 made of flat glass plate and the opposite ends of the porous substance 4110 are fixed to the support plate 4610 by adhesive tape 4620 such as vinyl adhesive tape.

Figure 24B:
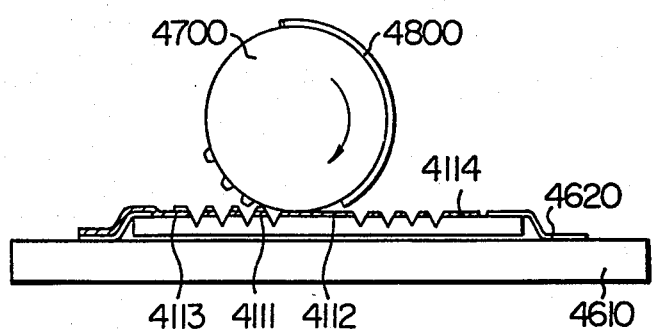

Then, as shown in FIG. 24B, conductive ink 4800 diluted with solvent is applied to a very thin thickness onto a printing roller 4700 made of rubber, in a shape corresponding to a desired pattern of display area and electrode leads 4113 and 4114, and the printing roller is properly positioned and then the conductive ink is rapidly transferred before the solvent evaporates. After the above process has been repeated two or three times, the conductive ink is dried at an appropriate temperature such as 60° C. to evaporate the solvent. By the forcive evaporation of the solvent, the conductive ink deposited becomes porous to contribute to a preferred operation. If resistance is too high, the above process is repeated until a desired resistance is obtained.

The diluted conductive ink 4800 on the roller 4700 is selectively transferred while leaving the depressions 4120 and the non-display area 4112 uncovered. Hardness of the roller 4700 is an important factor to accomplish such precise transfer. If it is too soft, the interiors of the depressions 4120 are covered with the conductive ink, and if it is too hard, the porous substance 4110 is damaged or uniform transfer is not attained. A preferable roller is a rubber roller having a hardness of 30 degrees.

While manually operated roller coating has been described, offset printing by a printing machine is effective for more precise mass production. The conductive ink used may be made of conductive particles made of silver, graphite or mixture thereof and major binder may be made of polyamid resin. When manual operated roller coating method is used, diluent or solvent may be mixture of hebutyl alcohol and octyl alcohol having relatively low evaporation rate. When offset printing machine is used, hexyl alcohol or amyl alcohol having relatively high evaporation rate may be used. Preferable ink viscosity is 150–300 poise.

Figure 24C:
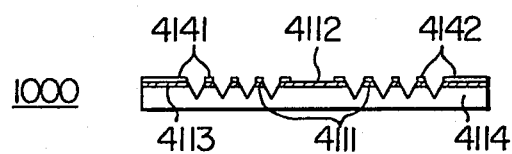

After the conductive ink has been selectively deposited on the porous substance 4110, the tape 4620 is removed and undesired portions of the porous substance 4110 are cut away to form a finished display structure 1000 as shown in FIG. 24C. The conductive ink is not deposited on the non-display area 4112, and electrodes 4141 and 4142 which are made of conductive ink and coupled to the electrode leads 4113 and 4114, respectively and insulated from each other are deposited.

When the conductive ink includes silver particles as the conductive particles, the silver particles may be chemically eroded. Therefore, an overcoating of electrode protecting ink is required. Plastic material is suitable for overcoating. For example, polyamide resin may be dissolved in alcohol and the resulting solution maY be selectively deposited on the conductive ink electrodes 4141 and 4142 etc., by the transfer from the roller 4700, while leaving the depressions 4120 uncovered, in a similar manner to the transfer of the conductive ink. The oil expelling agent 4160 described above may also be deposited by the transfer from the roller 4700. In any of the above cases, forcive evaporation of solvent by heating it to approximately 60° C. is preferable for making them porous.

FIG. 25 shows a pertial perspective view of another embodiment of the display structure of the present invention, which shows an example of overcoating by the electrode protective ink described above. In the illustrated embodiment, the depressions 4120 are lineshape parallel grating. Numeral 4140 denotes conductive ink including silver particle or graphite particles. Electrode protective ink 4170 made of polyamide resin is deposited thereon by the transfer from a roller.

The electrode protective ink 4170 may be substituted by the opaque ink 4150 described above. In this case, the opaque ink 4150 plays role of both electrode protection and block of light transmission at undesired or unnecessary area, and the manufacturing process can be simplified. Thus, while the opaque ink 4150 has been described to be interposed between the conductive ink 4140 and the porous substance 4110, it may be disposed on the conductive ink 4140 like in the present embodiment, or it may even be disposed between the conductive ink 4140 and the porous substance 4110 and also on the conductive ink 4140. This is also applicable to the embodiment of FIG. 21 described above and all other embodiments.

The electrode protective ink 4170 and the opaque ink 4150 are not applied onto the electrode lead 4115 to keep it for electrical contact. After it has been electrically contacted to external by a wire or the like, it may be applied with inks 4170 or 4150 if desired.

As described above, the present invention provides the display structure comprising the porous substance and the electrode made of conductive ink selectively applied and deposited thereon while leaving the depressions uncovered, and the display device utilizing the above display structure. It can provide a low resistance electrode structure and the manufacture thereof is very easy. In addition, the light transmission factor at the depressions can be increased and hence the display device can provide stable and sharp display.

FIG. 26 shows an improved power supply system for the display device of the present invention. A display device shown is that illustrated in FIG. 22.

In the power supply system of the previous embodiments, the display electrodes 4141 and 4142 are applied with a D.C. voltage having positive and negative symmetric amplitude relative to the other electrode 4400, or positive and zero operating voltages.

In the improved power supply system shown in FIG. 26, in order to block the transmission of an external light $L_1$ or diffuse-reflect it, a relatively high D.C. voltage $V_B$ of a polarity to cause the liquid impregnation factor at the surface of the porous substance 4110 (i.e. the surfaces of the depressions 4121″ in the illustrated embodiment) to be lowered, that is, to cause the liquid material 4400 to electroosmotically move toward the electrode 4300, is applied. On the other hand, in order to establish the light transmission state, a D.C. voltage $V_B'$ which is lower than the voltage $V_B$ in magnitude and of opposite polarity is applied across the electrode 4300 and the display electrode 4141 so that the liquid material 4400 electroosmotically moves toward the surface of the porous substance 4110 (i.e. the depressions 4121′ in the illustrated embodiment).

Assuming that the liquid material 4400 electroosmotically moves toward the negative electrode as described above, when a symmetric voltage in which the magnitudes of $V_B$ and $V_B'$ are equal is applied, the liquid material 4400 may overflow on the surface of the porous substance 4110 by a pumping effect due to the electroosmotic movement and, in the present embodiment, it is stored in the depressions 4120. This portion provides bright transmitted light $L_{2T}$ for the external light $L_1$. Under this condition, however, when the light transmission or light reflection with phase reversal is to be attained at the area corresponding to the display electrode 4142, for example, the external light $L_1$ is not transmitted or reflected until the liquid material 4400 stored on the surface of the porous substance 4110, that is, in the depressions 4120 has been completely absorbed into the interior of the porous substance 4110. As a result, response time is slow.

On the other hand, when the voltage $V_B'$ is zero, the liquid impregnation factor at the surface of the porous substance 4110 (i.e. the surfaces of the depressions 4121″ in the illustrated embodiment) at the portion facing the electrode 4142 is lowered so that the external light is controlled. Under this condition, when the voltage $V_B'$ is zero, the liquid material 4400 at the portion corresponding to the electrode 4141 is restored to the surface of the porous substances 4110 (i.e. the surface of the depressions 4121′) by the capillary action.

Although the restoration speed is relatively high, it cannot exceed a predetermined limit. In addition, the liquid impregnation factor at the surface may not be sufficiently large due to incomplete restoration of the liquid and hence fully transparent state may not be attained in some cases.

In the present embodiment, since the voltage $V_B'$ which is smaller than and of opposite polarity to the voltage $V_B$ is applied, this voltage, in cooperation with the capillary action, forces the liquid material 4400 to restore to the surface.

As a result, the restoration response time to the transparent state is shortened. In addition, by selecting the amplitude of the voltage $V_B'$ appropriately low relative to the voltage $V_B$, a problem of the reduction of response speed due to excess overflow of the liquid onto the surface as seen in the embodiment using the symmetric voltage is resolved.

In particular, when the voltage $V_B'$ is a variable D.C. voltage, the response time and the control of the external light can be optimally controlled by simply adjusting the voltage.

In an experiment, when the amplitude of $V_B'$ is 20% or less of the maximum amplitude of $V_B$, the overflow of the liquid material 4400 onto the surface is prevented and sharp and high response display is provided. For example, in the construction having the porous substance and the liquid material described above, when the maximum amplitude of $V_B$ is 50–80 volts, $V_B'$ is fixed to an appropriate voltage between 10 volts and 16 volts to attain a satisfactory operation.

In the illustrated embodiment, the voltage is applied thicknesswise of the porous substance or composite body. When a voltage is applied laterally of the composite body 100 as shown in FIG. 7. the D.C. voltage applied to the display electrode 532 relative to the electrode 531 is relatively high positive or negative voltage for the display operation (scatter and reflection of external light) when the liquid material electroosmotically moves toward negative or positive electrode, respectively, and the D.C. voltage $V_B$ is a relatively low negative or positive voltage, respectively, for the restore operation. In this manner, non-symmetric voltage is applied.

FIG. 27 shows a structure, in longitudinal section, of one embodiment of a further improved display device of the present invention, which is an improvement over the embodiment of FIG. 22, and a powering system therefor.

In the embodiments described above, such as in the embodiment of FIG. 10, the composite body 100 is mounted on the surface of the flat support plate 1110 and the electroosmotic movement of the liquid material 1140 toward the electrode 1120 in response to the application of the voltage $V_B$ is accomodated in the gap 1180 to control the liquid impregnation factor at the surface of the porous substance 1130.

However, a wide-area display device may frequently makes partially ununiform operation. One of the causes thereof is that the porous substance 1130 locally strongly attaches to the support plate 1110 on which the electrode 1120 is deposited so that the flow-out and flow-in of the liquid material from and to the gap 1180 are impeded.

The present embodiment is intended to resolve the above problem to provide uniform display.

As shown in FIG. 27, either by forming a number of depression gaps 4181 on the surface of the porous substance which faces the electrode 4300 or by forming depression gaps 4182 on the surface of the support plate on which the electrode 4300 is deposited, or by both of them effective unevenness is formed at the gap 4180 between the composite body 100 and the support plate 4200 on which the electrode 4300 is deposited to increase the degree of freedom of flow-in and flow-out of the liquid material.

Since the effective unevenness is formed at the gap 4180 by the depression gaps 4181 and 4182 and the liquid material 4400 flows into and out of the gaps, the ununiformity in the operation is eliminated.

The formation of the depression gaps 4181 in the porous substance 4110 may be made by embossing method similar to that used to form the depression 3120 (or 4120 in the present embodiment) shown in FIG. 15.

The depression gaps 4181 may be of dot-shape line-shape, parallel grating, strip-shape or grid-like, like the depression 3120. The depth of the depression 4120 is shallow such as 10 - 30 $\mu$m so that the depressions 3120 and 4120 are not mechanically damaged by the formation process of the depressions 4120. The density of the depressions may be 100-400 depressions per inch.

The depression gaps 4182 formed on the surface of the support plate 4200 may be of the same shape as the depression gaps 4181, but when the support plate 4200 is made of glass plate, they may be easily formed by chemical etching by fluodic acid or sand blasting to form unevenness on the surface. The desired electrode 4300 is directly deposited on the uneven surface, as shown in FIG. 27. For the light transmission type display device, the electrode 4300 is light transmissive as described above, and for the light reflection type display device an evaporated metal film is deposited.

FIG. 28 shows a partial perspective view, in longitudinal section, of one embodiment of the display device of the present invention, which illustrates the formation of isolated electrodes for the display structure shown in FIG. 21.

It is necessary to form a plurality of segment electrodes insulated from each other to display numerals or characters either by light transmission or light reflection. In the present embodiment, the insulation and isolation of the plurality of electrodes are carried out by forming depression grooves which continuously extend to follow the outlines of the electrodes, in the surface of the porous substance.

In FIG. 28, depression grooves 4122' and 4122" which continuously extend to follow the outlines of display areas 4141' and 4142' having a plurality of depressions of dot, line or stripe-shape (dot-shaped depressions being shown in FIG. 28) and electrode lead areas 4141" and 4142" which are contiguous to the display areas 4142' and 4141', respectively, are formed by embossing method like the formation of the depression 4120. Conductive ink is directly transferred and applied thereon over the entire area of the porous substance 4110 by roller coating method described above. The conductive ink is applied onto the display areas 4141' and 4142' excluding the depressions 4120, the electrode lead areas 4141" and 4142" contiguous to the display areas 4141' and 4142', respectively, and the non-display area 4143, but it is not applied on the depression grooves 4122' and 4122".

Accordingly, by the presence of the depression grooves 4122' and 4122", the segment electrode 4141 made of the conductive ink applied over the electrode lead area 4141" which is contiguous to the display area 4141', and the segment electrode 4142 applied on the electrode lead area 4142" which is contiguous with the display area 4142' are insulated from each other and they are also insulated from the conductive ink 4143 on the non-display area.

In order to attain the insulation by the depression grooves 4122' and 4122", it is essential that the conductive ink is not transferred to the depression grooves during roller coating of the conductive ink. According to an experiment, it is desirable that cross section width and depth of the depression groove are in the same order as or more than those of the depressions 4120. The cross section width of the depression groove at the surface of the porous substance is 20–100 μm and the depth is 15–60 μm although it varies depending on the thickness of the porous substance. The cross section width preferably becomes narrower as it goes into the interior of the porous substance. Preferable cross section shape is triangle or pedestal.

If the cross section width and the depth are too small, the conductive ink flows into the depression grooves and the isolation and insulation are difficult to attain. When the cross section width is too wide the same thing occurs, and if the depth is too large the porous substance is damaged by excess embossing.

When the display structure having the electrodes isolated by the depression grooves is used as a light transmission type display device, the depression grooves transmit light, in some cases, to materially degrade the quality of displayed image. In such cases, as shown in FIG. 28, opaque forming agent 4150 made of opaque ink or oil expelling agent as described above may be applied on the inner surfaces of the depression grooves 4122' and 4122", and/or opaque forming agent 4151 may be applied on the surface of the porous substance 4110 which is opposite to the surface facing the depression grooves 4122' and 4122" at those positions corresponding to the depression grooves 4122' and 4122" to the width equal to or wider than those depression grooves 4122' and 4122", in order to effectively block the light transmission through the depression grooves 4122' and 4122".

In this case, by applying the opaque forming agent 4150 to cover the surface portions corresponding to the depression grooves 4122' and 4122", the nondisplay areas 4143 and the electrode lead areas 4141" and 4142", more sharp transmission type display is provided.

The display structure 1000 shown in FIG. 28 may be mounted on a support plate having electrodes deposited thereon, and the opaque forming agent 4150 may be deposited on the surface portions of the support plate corresponding to the depression grooves 4122' and 4122", the electrode lead areas 4141" and 4142" and the non-display area 4143.

By applying the opaque forming agent over the entire surface except the display areas 4141' and 4142', as described above, sharp display can be carried out.

In the embodiment shown in FIG. 28, the depressions 4120 are first formed on the surface of the porous substance 4110 by embossing method and then the opaque forming agent 4150 made of opaque ink or oil expelling agent is transferred by roller coating method. Then, the depression grooves 4122' and 4122" are formed by embossing method, the conductive ink is transferred by roller coating method and then the opaque forming agent 4151 is applied. When the opaque forming agent 4151 is applied on the back surface of the support plate or the porous substance, the application of the opaque forming agent to the inner wall of the depression grooves 4122' and 4122" may be omitted.

In such a case, the depressions 4120 and the depression grooves 4122' and 4122" may be embossed on the surface of the porous substance 4110 through a single copper mask plate or separate copper mask plates and then the opaque forming agent 4150 may be applied.

A similar display structure 1000 may be formed by forming the depression grooves 4120 on the entire surface of the porous substance 4110. In this case, the opaque forming agent 4150 or 4151 is selectively applied on at least one of opposite surfaces of the porous substance 4110 while leaving the areas corresponding to the display areas 4141' and 4142' uncovered, and then the depressions 4120 are embossed on the entire area of one of the surfaces of the porous substance 4110, then the depression grooves 4122' and 4122" are embossed on that surface and the opaque forming agent and the conductive ink are sequentially applied by roller coating method.

The depression gaps 4181 shown in FIG. 27 are formed, after the completion of the above process, by embossing them on the surface of the porous substance 4110 on which the opaque forming agent 4151 has been applied.

The display device in accordance with the present invention can realize a color display device.

The color display device can be attained by applying light transmissive colored ink such as gravure ink to the surface of the porous substance which is exposed to the open space, or to the opposite surface of the porous substance, or applying it to the surface of the support plate which supports the display structure, or by a combination of the above. An external light is reflected or scattered at the surface of the porous substance which is exposed to the open space, and the color of the output light is determined by the color of the applied light transmissive ink.

Such a color display device can be attained in either light transmission type operation or light reflection type operation. In this case, the porous substance is made of light transmissive dielectric material and the light transmissive liquid material preferably has substantially same index of refraction as the dielectric material. Since the color of the output light is determined by the transmission color when the external light transmits through the color ink, display of any desired color can be attained by an appropriate selection of the color ink. This is an important advantage of the color display device of the present invention.

FIG. 29 shows a partial structure, in longitudinal section, of one embodiment of a transmission type color display device in accordance with the present invention.

In the present embodiment, light transmissive color inks such as gravure inks, that is, red ink R, green ink G and blue ink B are applied in belt shape on the surface of the porous substance 4110 to a thin thickness to permit them to permeate liquid. Opaque forming agent 4122 such as black ink is applied onto the spaces between the belt-shaped color inks R, G and B. Then, linear depressions 4120 are embossed at the centers of the belt-shaped colored ink R, B and G and linear depression grooves are embossed at the centers of the belt-shaped opaque forming agent 4150 to isolate the electrodes.

Then, conductive ink is applied on the surface of the porous substance 4110 by roller coating method. The resulting display electrodes 4143, 4144 and 4145 made of conductive ink are isolated from each other by the depression grooves 4122. The display structure thus formed is mounted on the light transmissive support plate on which the light tranmissive electrode 4300 is deposited, and the light transmissive liquid material which allows the matching of index of refraction with the porous substance 4110 is impregnated therein to complete the composite body 100.

The display electrodes 4143, 4144 and 4145 and the light transmissive electrode 4300 are connected to feeding terminals $Y_R$, $Y_G$, $Y_B$ and $X_O$, respectively, and a D.C. voltage is selectively applied across the terminal $X_O$ and the terminals $Y_R$, $Y_G$ and $Y_B$. In response to the applied voltage, the liquid impregnation factors at the sloped surfaces of the depression 4120 on which the colored inks R, G and B are applied are controlled to control the light transmission for transmitted lights $L_R$, $L_G$ and $L_B$ for an external light $L_1$.

The colors of the transmitted lights are red, green and blue corresponding to the colored inks R, G and B.

Like the conductive ink described above, the color inks R, G and B are to be made of materials which are not dissolved by the liquid material used. For the liquid material described above, preferred material comprises polyamid resin binder and alcohol solvent such as heptyl alcohol or octyl alcohol.

FIG. 30 shows a structure, in longitudinal section, of another embodiment of the color display device of the present invention, which is shown in association with FIG. 29.

The color inks such as the red ink R and the green ink G may be applied on the surface of the porous substance 4110 which is opposite to the surface on which the depression 4120 is formed, at the surface portions positionally corresponding to the depressions 4120. The color ink such as the blue ink B may also be applied on the surface of the support plate 4200 on which the electrode 4300 is deposited, at the surface portion positionally corresponding to the depressions 4120. The opaque forming agent such as black ink for blocking the light transmission through the depression grooves 4142 may be applied on the opposite surface of the porous substance 4140 at the surface portions positionally corresponding to the depression grooves 4142, as shown by 4150′, or it may be applied on the support plate 4200 at the surface portions positionally corresponding to the depression grooves 4142′, as shown by 4150″.

When the light reflection type display devices as shown in FIGS. 12, 13 and 14 are to be constructed, the color ink may be applied on the surface of the porous substance which is exposed to the open space as well as on the inner surfaces of the depressions.

In this case, the color ink may be applied on the electrodes 2151 and 2152, or the color ink may be applied first and then the electrodes 2151 and 2152 are formed thereon.

While one depression has been shown for each of the color inks R, G and B in the embodiment of FIG. 30, the color inks may be applied over the entire display area if the display area includes more than one depressions.

FIG. 31 shows a structure, in longitudinal section, of another embodiment of the display device of the present invention, which is intended to provide a structure of effective package.

In the display device of the present invention, it is essential that at least one surface of the composite body is exposed to the open space. The liquid material is impregnated in the porous substance of the display structure at a uniform density. The loss of liquid material such as by evaporation must be prevented. Thus, in the embodiment of FIG. 31, an auxiliary support plate 4201 is provided in addition to the support plate 4200 and those plates are bonded together by adhesive material 4311 with spacers 4320 being interposed therebetween to seal the composite body. Liquid impregnating material 4330 such as sponge or porous substance is disposed on the inner surface of the seal around at least one periphery thereof or perferably around all peripheries, and the composite body 100 having the display electrodes 4146 and 4147 formed thereon is mounted by a spacer 4331 in the seal. Light transmissive liquid material is impregnated into the composite body 100 and the liquid impregnating material 4330.

The bonding material 4311 may be epoxy resin, cellulose bonding material or siano acrylate resin, and the spacers 4320 may be made of polyester film or cellulose acetate film. The liquid impregnating material 4330 used should be those which are not chemically attached by the light transmissive liquid material, such as polyurethane foam or glass wool. The support plate 4200 and the auxiliary support plate 4201 are made of transparent glass plate, and the electrode 4300 deposited on the support plate 4200 is a transparent electrode for the transmission type display and a metal evaporation electrode for the reflection type display. An electrode conductor 4301 for powering is connected to the electrode 4300 and electrode conductors 4246 and 4247 are connected to the display electrodes 4146 and 4147, respectively, for external connection.

According to the present embodiment, since the composite body 100 is held in the sealed space 4400 (which constitutes an open space for the composite body 100), the loss of liquid material by evaporation is prevented. In addition, when the amount of liquid material impregnated in the composite body 100 is short, it is supplemented from the liquid impregnating material 4330, and when the liquid material is excessive, the excess liquid material is accomodated in the liquid impregnating material 4330. In this manner, stable and uniform operation is attained. When the areas of the selectively and independently activated electrodes (i.e. display electrodes 4146 and 4147) are large, the liquid impregnating material 4330 may be disposed to circle the respective display areas to further improve the uniformity of operation.

The liquid impregnating material 4330 may be transparent or opaque, but it is preferably opaque such as black for easier observation of displayed pattern.

The light transmissive liquid material is poured through an injection hole 4202 formed in the auxiliary support plate 4201, and after pouring the injection hole 4202 may be sealed by sealing agent 4203 such as epoxy resin.

While various embodiments of the present invention have been shown and described, it should be understood that they may be practiced in any appropriate combination.

As decribed above, the present invention provides the display device in which the light transmissive liquid material is impregnated in the porous substance and the liquid impregnation factor at the surface of the porous substance which is exposed to the open space is changed by the electroosmotic movement of the liquid material to control the external light. Unlike the liquid crystal display device, the display device of the present invention has very wide temperature range for operation. That is, the upper limit of the operating temperature is determined by a boiling point of the liquid material and a softening point of the dielectric material, and the lower limit is determined by a freezing point of the liquid material. Thus, the operating temperature range of -30° C. to 120° C. can be attained, which is much wider than the operating temperature range of the liquid crystal device of 0° to 60° C.

Furthermore, since the electroosmotic movement is used, the orientation process needed for the liquid crystal device is not required. In addition, since the porous substance such as cellulose ester, which is a kind of paper, is used, a wide area material of uniform thickness is available. Thus, together with the advantage of no orientation process, a very wide area display device can be provided. Furthermore, by appropriately selecting the color ink, color display of any desired color can be provided.

By arranging a number of electrodes insulated from each other and selectively powering them, an alphanumeric display device can be provided, and by applying a voltage pattern or charge pattern to the composite body, a light transmission type or reflection type image display device can be provided.

What we claim is:

1. A display device for controlling a display of light comprising:
    a composite body including a porous substance member and liquid material impregnated in said porous substance member, said liquid material having an index of refraction substantially equal to the index of refraction of said porous substance member and having a resistivity selected to permit the operation of said display device;
    at least one first eletrode disposed proximate a surface of said composite body;
    at least one second electrode disposed proximate a surface of said composite body; and
    means for applying a signal voltage between said first and second electrodes to move the liquid material in the porous substance member,
    whereby the liquid impregnation factor of the porous substance member is controlled by the movement of the liquid material in the porous substance member in response to the signal voltage to control the display of light.

2. The display device according to claim 1, wherein said liquid material is mixture of at lease one liquid having a higher index of refraction than that of the porous substance member and a second liquid having a lower index of refraction than that of the porous substance member.

3. The display device according to claim 1, wherein said porous substance member has a plurality of openings substantially extending therethrough from one surface thereof to the other surface.

4. The display device according to claim 1, wherein said porous substance member is made of light transmissive dielectric material selected from nitrocellulose, cellulos acetate, mixture thereof, polypropylene, polyamide, vinyl chloride resin, or any combination thereof.

5. The display device according to claim 1, wherein said porous substance member is a microporous membrane filter made of light transmissive dielectric material of synthetic resin and has pores substantially extending from one surface to the other surface thereof.

6. The display device according to claim 1, wherein said composite body is disposed and supported on a support plate.

7. The display device according to claim 6, wherein said support plate is made of electrically insulative material, and said first and second electrodes are disposed on the surface of said support plate facing said composite body.

8. The display device according to claim 6, wherein said first electrode is disposed between said composite body and said support plate, and said second electrode is disposed on the surface of said composite body opposite to the surface facing said first electrode.

9. The display device according to claim 6, wherein said support plate is made of metal and used as said first electrode, and said second electrode is disposed on the surface of said composite body opposite to said support plate.

10. The display device according to claim 6, wherein said first electrode is light reflective or opaque and disposed between said support plate and said composite body, and said second electrode is light transmissive and disposed on the surface of said composite body opposite to said support plate.

11. The display device according to claim 6, wherein a plurality of first electrodes are light reflective or opaque, insulated from each other and disposed between said support plate and said composite body, and said second electrode is liquid permeative and light transmissive and disposed on the surface of said composite body opposite to said support plate.

12. The display device according to claim 10 or 11, wherein said first electrode is an evaporated metal film deposited on the surface of at least one of opposing said support plate and said composite body.

13. The display device according to claim 10 or 11, wherein said first electrode is made of conductive paint including at least graphite particles, deposited on the surface of at least one of the opposing said support plate and said composite body.

14. The display device according to claim 6, wherein said first electrode is deposited on said support plate, an opaque material disposed between said first electrode and said composite body, and said second electrode is deposited on the surface of said composite body opposite to said support plate.

15. The display device according to claim 1, wherein said porous substance member is made of light transmissive material having a plurality of openings exposed to at least one surface thereof and depressions formed in the surface of said porous substance member, an opaque material being deposited on the surface of said porous substance member while leaving said depressions uncovered.

16. The display device according to claim 15, wherein said opaque material is an opaque ink or oil expelling agent.

17. The display device according to claim 1, wherein said porous substance member has a plurality of openings exposed to at least one surface thereof and depressions formed in the surface of said porous substance member.

18. The display device according to claim 17, wherein opaque ink is selectively deposited on the surface member of said porous substance while leaving said depressions uncovered, and the first electrode made of conductive ink is selectively deposited on said opaque ink while leaving said depressions uncovered.

19. The display device according to claim 17, wherein light transmissive and liquid permeative conductive film is deposited on the surface of said porous substance member and the inner surfaces of said depressions, and the first electrode made of conductive ink is selectively deposited on said conductive film while leaving said depressions uncovered.

20. The display device according to claim 17, wherein light transmissive and liquid permeative conductive film is deposited on the surface of said porous substance member and the inner surfaces of said depressions, opaque ink is selectively deposited on said conductive film while leaving said depressions uncovered, and the first electrode made of conductive ink is selectively deposited on said opaque ink while leaving said depressions uncovered.

21. The display device according to claim 17, wherein said depressions are formed on the surface of said porous substance member at positions corresponding to one or more patterns to be displayed, opaque ink is selectively deposited on the surface of said porous substance member while leaving said depressions uncovered, one or more first electrodes made of conductive ink are disposed at positions corresponding to said one or more patterns to be displayed and coupled to electrode lead areas and selectively deposited while leaving said depressions uncovered.

22. The display device according to claim 17, wherein an opaque material is selectively deposited on said first electrode while leaving said depressions uncovered.

23. The display device according to claim 22, wherein said opaque material is an opaque ink or oil expelling agent.

24. The display device according to claim 17, wherein said depressions are formed in the surface of said porous substance member at a position corresponding to a pattern to be displayed, said first electrode made of conductive ink selectively deposited on the surface of said porous substance member to cover the portion corresponding to the pattern while leaving said depressions uncovered, and an opaque ink selectively deposited on the surface of said porous substance member while leaving said pattern uncovered.

25. The display device according to claim 17 wherein said first electrode is made of conductive ink including conductive particles of at least one of graphite and silver.

26. The display device according to claim 17 wherein said first electrode is made of conductive ink and major binder of said conductive ink is polyamid resin.

27. The display device according to claim 17, wherein electrode protective ink is selectively deposited on said first electrode while leaving said depressions uncovered.

28. The display device according to claim 6, wherein a plurality of depressions are formed in at least one of surfaces of said porous substance member, and a gap is formed between said support plate and said porous substance member.

29. The display device according to claim 17, wherein said depressions are formed on the surface of said porous substance member at positions corresponding to a plurality of patterns to be displayed, and first electrodes are made of conductive ink selectively formed on areas of said patterns while leaving said depressions uncovered, and grooves continuously extending to follow outlines of said patterns are formed to provide non-application area of said conductive ink.

30. The display device according to claim 29, wherein an opaque material is applied on at least one of the wall surfaces of said grooves formed on a first surface of said porous substance member and on a second surface of said porous substance member opposite to said first surface at positions on said second surface corresponding to said grooves.

31. The display device according to claim 29, wherein said first electrodes are disposed on the surface of said support plate and opaque ink is deposited on said support plate at position corresponding to said depressions.

32. The display device according to claim 6, wherein light transmissive color ink is applied to one of surfaces of said porous substance member or the surface of said support plate.

33. The display device according to claim 32, wherein said porous substance member has a plurality of depressions formed on a surface thereof and color ink is applied to the surface of the porous substance member on which said depressions are formed.

34. The display device according to claim 33, wherein said porous substance member is made of plastic material, said depressions being formed by embossing said porous substance member after said color ink has been applied, and at least one of opaque ink or conductive ink forming the first electrode is selectively applied and deposited while leaving said depressions uncovered.

35. The display device according to claim 6, wherein a light transmissive auxiliary support plate is disposed to be spaced from the surface of said composite body opposite to said support plate, said auxiliary support plate and said support plate being sealed together by bonding material at the peripheries thereof with spacers being interposed therebetween, and liquid impregnating material is disposed at the inner edges of said support plates to contact with said composite body and disposed between said auxiliary support plate and said support plate.

36. The display device according to claim 35, wherein said composite body has a plurality of selectively actuable display areas, and the liquid impregnating material is disposed around said display areas.

37. The display device according to claim 6, wherein said first electrode is disposed between said composite body and said support plate, said second electrode isolated from said first electrode and disposed either between said composite body and said support plate or on the surface of said porous substance member opposite to the surface facing said support plate, a display area for controlling light provided on the surface of said porous substance member opposite to said support plate at the position corresponding to at least one of said first and second electrodes, and a signal voltage applying means provided to apply a D.C. voltage between said first and second electrodes in such a polarity that said light transmissive liquid material is caused to move from one of said first and second electrodes to the other electrode, for reducing liquid impregnation factor at said display area.

38. The display device according to claim 36, wherein second signal voltage applying means for applying zero-volt signal between said first and second electrodes is provided to restore the reduction of the liquid impregnation factor at the display area.

39. The display device according to claim 36, wherein second signal voltage applying means for applying a D.C. voltage of equal magnitude and opposite polarity to said signal voltage between said first and second electrodes is provided to restore the reduction of the liquid impregnation factor at the display area and even increase the liquid impregnation factor.

40. The display device according to claim 37, wherein second signal voltage applying means for applying a D.C. voltage of smaller magnitude than and of opposite polarity to said signal voltage between said first and second electrodes is provided to restore the reduction of the liquid impregnation factor at the display area and even increase the liquid impregnation factor.

41. The display device according to claim 1, wherein a lustrous member is disposed on one of surfaces of said composite body, a circular polarization plate disposed on another surface such that light transmitted through said circular polarization plate is transmitted through said composite body and reflected by said lustrous metal member.

42. The display device according to claim 30, wherein said opaque material is an opaque ink or oil expelling agent.

43. The display device according to claim 1 wherein said porous substance member is made of dielectric material.

44. The display device according to claim 1 wherein said porous substance member is made of a microporous membrane filter.

45. A substantially flat display device according to claim 1 wherein said composite body is substantially flat.

46. The display device according to claim 1 wherein liquid material has one of monosilane structure, siloxane structure and naphthalene structure.

47. The display device according to claim 1 wherein said first electrode is disposed proximate a first surface of said composite body and said second electrode is disposed proximate a second surface of the composite body opposite to said first surface.

48. The display device according to claim 1 wherein both of said first and second electrodes are disposed proximate one of the surfaces of said composite body.

49. The display device according to claim 1 wherein at least one of said first and second electrodes includes a plurality of electrode elements electrically insulated from one another.

50. The display device according to claim 1 wherein at least one of said first and second electrodes is formed into seven segment electrode display.

51. The display device according to claim 1 wherein at least one of said first and second electrodes is made of metal oxide.

52. The display device according to claim 1 wherein at least one of said first and second electrodes is made of a conductive film which is thinner than a pore diameter of the porous substance member.

53. The display device according to claim 1 wherein said voltage supply means includes a D.C. voltage source or an A.C. voltage source.

54. The display device according to claim 1, wherein said porous substance member is made of nitrocellulose, and said liquid material is made of dimethyl-triphenyl-trimethoxysiloxane.

55. The display device according to claim 1, wherein said porous substance member is made of cellulose acetate, and said liquid material is made of a mixture of methacryloxypropyl-trimethoxy-silane and a material selected from methylnapthalene and chloro-naphthalene.

56. The display device according to claim 1, wherein said porous substance member is made of cellulose acetate, and said liquid material is made of phenyl-trimethoxy-silane.

57. The display device according to claim 1, wherein said porous substance member is made of a mixture of nitrocellulose and cellulose acetate, and said liquid material is made of a mixture of dimethyl-triphenyl-trimethoxy-silane and phenyl-trimethoxy-silane.

58. The display device according to claim 1 further comprising a support member for supporting said composite body.

59. The display device according to claim 58 wherein said first electrode is disposed proximate a first surface of said composite body and said second electrode is disposed proximate a second surface of the composite body opposite to said first surface.

60. The display device according to claim 59 wherein said second electrode is disposed on the surface of the support member facing said composite body and a gap is formed between said composite body and said second electrode, whereby said liquid material flows into said gap upon its movement in response to the signal voltage.

61. The display device according to claim 59 wherein said support member is made of electric conductive material and used as said second electrode.

62. The display device according to claim 61 wherein said first electrode is a single electrode and said support member is divided into a plurality of sections which are electrically insulated from one another.

63. The display device according to claim 58 wherein both of said first and second electrodes are disposed proximate one of surfaces of said composite body.

64. The display device according to claim 58 wherein at least one of said first and second electrode includes a plurality of electrode elements electrically insulated from one another.

65. The display device according to claim 1 further comprising a light absorbing or light reflecting layer disposed proximate a surface of said composite body.

66. The display device according to claim 65 wherein said light absorbing or light reflecting layer is made of electric conductive material and used as said second electrode.

67. The display device according to claim 65 wherein said second electrode is light transmissive and said light absorbing or light reflecting layer is disposed proximate a first surface of the second electrode opposite to a second surface of the second electrode facing the composite body.

68. The display device according to claim 1 wherein said first and second electrodes are disposed proximate one of the surfaces of said composite body and insulated from each other.

69. The display device according to claim 68 wherein width of said first and second electrodes is longer than space between said first electrode and said second electrode adjacent to the first electrode.

70. The display device according to claim 68 further comprising a support member for supporting said porous substance member, said first and second electrodes being disposed on the surface of said support member facing said porous substance member.

71. The display device according to claim 68 further comprising a support member for supporting said porous substance member, said first and second electrodes being disposed on the surface of said porous substance member opposite to said support member.

72. The display device according to claim 1 wherein said first and second electrodes are disposed proximate one of the surfaces of said composite body and insulated from each other, and further comprising at least one opaque layer for covering at least one of said first and second electrodes.

73. The display device according to claim 72 wherein at least one of first and second electrode is made of opaque material and used as said opaque layer.

74. A reflection type display device according to claim 1, wherein said porous substance member is opaque, and said liquid material is light transmissive.

75. The reflection type display device according to claim 74 wherein said opaque porous substance member is formed by adding coloring agent to a porous substance material.

76. The reflection type display device according to claim 74 wherein said opaque porous substance member is a black microporous membrane filter.

77. A reflection type display device according to claim 1, wherein said liquid material is light transmissive and further comprising at least one light reflective member disposed proximate a first surface of said composite body, and at least one light polarizing member disposed proximate a second surface of the composite body opposite to said first surface.

78. The reflection type display device according to claim 77, wherein said first electrode is light transmissive and disposed proximate said second surface of said composite body, and said second electrode is disposed proximate said first surface of said composite body.

79. The reflection type display device according to claim 77, wherein said first and second electrodes are light transmissive and disposed proximate said second surface of said composite body.

80. The display device according to claim 1, wherein said porous substance member has a plurality of depressions formed in a surface thereof.

81. The display device according to claim 80 wherein said porous substance member has a plurality of openings and the size of each depression is larger than that of each opening.

82. A display device for controlling a display of light comprising:
a porous substance member having a plurality of openings and a plurality of depressions formed in a surface thereof, the size of each depression being larger than that of each opening;
liquid material impregnated in said porous substance member, said liquid material having an index of refraction substantially equal to the index of refraction of said porous substance member and having a resistivity selected to permit the operation of said display device;
at least one first electrode disposed proximate a surface of said porous substance member;
at least one second electrode disposed proximate a surface of said porous substance member; and
means for applying a signal voltage between said first and second electrodes to move the liquid material, in the porous substance member,
whereby the liquid impregnation factor of the porous substance member is controlled by the movement of the liquid material in the porous substance member in response to the signal voltage to control the display of light and characteristics of the display is enhanced by the depressions.

83. The display device according to claim 82 wherein said openings includes pores, gaps, holes or grooves which substantially extend from one surface of the porous substance member to another surface of the porous substance member.

84. The display device according to claim 82 wherein said porous substance member is substantially flat.

85. The display device according to claim 82 wherein each depression has a shape of dot, spot, line, groove, grating or a combination thereof.

86. The display device according to claim 82 wherein said porous substance member has a surface having a first portion to provide a display area and a second portion to provide a non-display area, said depressions being formed in said first portion of the surface of said porous substance member.

87. The display device according to claim 82 wherein said depressions has wall surfaces colored by coloring agent.

88. The display device according to claim 82 wherein first electrode is light transmissive and disposed on a surface of said porous substance member and on inner surfaces of said depressions.

89. The display device according to claim 82, wherein said depressions are formed in a first surface of said porous substance member, and said first electrode is disposed proximate said first surface of the porous substance member, and said second electrode is disposed proximate a second surface of said porous substance member spaced from said first surface, and further comprising an opaque material disposed proximate said first surface of the porous substance member while leaving said depressions uncovered.

90. The display device according to claim 82, wherein said depressions are formed in a first surface of said porous substance member, and said first electrode is made of conductive film and disposed on said first surface of the porous substance member and on inner surfaces of said depressions, said second electrode is disposed proximate a second surface of said porous substance member spaced from said first surface, and further comprising conductive ink disposed on said first electrode while leaving said depressions uncovered for preventing a breakdown of said first electrode.

91. The display device according to claim 82, wherein said depressions are formed in a first surface of said porous substance member, and said first electrode is made of conductive film and disposed on said first surface of the porous substance member and on inner surfaces of the depressions, and said second electrode is disposed proximate a second surface of said porous substance member spaced from said first surface, and further comprising an opaque layer disposed on said first electrode while leaving said depressions uncovered, and conductive ink disposed on said opaque layer while leaving said depressions uncovered for preventing a breakdown of said first electrode.

92. The display device according to claim 90 wherein said conductive ink is opaque.

93. The display device according to claim 90 or 91 wherein said first surface of the porous substance member has a first portion to provide a display area and a second portion to provide a non-display area, said depressions being formed in said first portion of the first surface of said porous substance member.

94. The display device according to claim 82, wherein said porous substance member has a first surface, which surface has at least one first portion to provide a display area and a second portion to provide a non-display area, said depressions being formed in said first portion, and said first electrode is disposed proximate said first portion of the first surface of the porous substance member, and said second electrode is disposed proximate a second surface of said porous substance member spaced from said first surface, and further comprising an opaque material disposed proximate at least said second portion of the first surface of the porous substance member.

95. The display device according to claim 94 wherein said first electrode is made of conductive ink and disposed on said first surface while leaving said depressions uncovered.

96. The display device according to claim 94 wherein said opaque material is disposed on said first surface of the porous substance member while leaving said depressions uncovered and said first electrode made of conductive ink is disposed on said opaque material corresponding to said first portion of the first surface while leaving the depressions uncovered.

97. The display device according to claim 82, wherein said depressions are formed in a first surface of the porous substance member, and said first electrode is disposed proximate said first surface of the porous substance member, and said second electrode is disposed proximate a second surface of said porous substance member spaced from said first surface, and further comprising opaque ink disposed proximate said first surface of the porous substance member while leaving said depressions uncovered, and oil expelling material disposed proximate said first surface of the porous substance member while leaving said depressions uncovered for preventing a flowout of said liquid material.

98. The display device according to claim 82, wherein said depressions are formed in a first surface of said porous substance member, and said first electrode is disposed proximate said first surface of the porous substance member, and said second electrode is disposed proximate a second surface of said porous substance member spaced from said first surface, and further comprising oil expelling material disposed proximate said first surface of the porous substance member while leaving said depressions uncovered for preventing said liquid material from flowing into the display surface of said display device.

99. The display device according to claim 82, wherein said depressions are formed in a first surface of said porous substance member, and said first electrode is disposed on said first surface of said porous substance member, and said second electrode is disposed proximate a second surface of the porous substance member spaced from said first surface, and further comprising electrode protective material disposed on said first electrode.

100. The display device according to claim 99 wherein said electrode protective material includes resin or opaque ink.

101. A color display device according to claim 82, further comprising liquid permeative coloring agent deposited on inner surfaces of said depressions.

102. A color display device according to claim 82, wherein said depressions are formed in a first surface of said porous substance member, and further comprising coloring agent deposited proximate a second surface of said porous substance member corresponding to said depressions.

103. A display device for controlling a display of light comprising:
   a porous substance member;
   liquid material impregnated in said porous substance member said liquid material having an index of refraction substantially equal to the index of refraction of said porous substance member and a resistivity selected to permit the operation of said display device;
   at least two first electrodes disposed proximate a first surface of said porous substance member and electrically insulated from each other;
   at least one second electrode disposed proximate a second surface of said porous substance member spaced from said first surface;
   first means for applying a first signal voltage between one first electrode and second electrode to move the liquid material in the porous substance member; and second means for applying a second signal voltage having an opposite polarity of said first signal voltage between another first electrode and said second electrode to move the liquid material in the porous substance member, whereby the liquid impregnation factor of the porous substance member is controlled by the movement of the liquid material in the porous substance member in response to the first and second signal voltages to control the display of light.

104. A display device for controlling a display of light comprising:

a porous substance member having a plurality of first depressions in a first surface thereof and a plurality of second depressions in a second surface opposite to said first surface;

liquid material impregnated in said porous substance member, said liquid material having an index of refraction substantially equal to the index of refraction of said porous substance member and having a resistivity selected to permit the operation of said display device;

at least one first electrode disposed proximate said first surface of the porous substance member;

at least one second electrode disposed proximate said second surface of the porous substance member; and means for applying a signal voltage between said first and second electrodes to move the liquid material in the porous substance member, whereby the liquid impregnation factor of the porous substance member is controlled by the movement of the liquid material in the porous substance member in response to the signal voltage to control the display of light and characteristics of the display is enhanced by the first and second depressions.

105. A display device for controlling a display of light comprising:

a porous substance member having a plurality of first depressions on a first surface thereof;

liquid material impregnated in said porous substance member, said liquid material having an index of refraction substantially equal to the index of refraction of said porous substance member and having a resistivity selected to permit the operation of said display device;

support member disposed proximate a second surface of the porous substance member for supporting the porous substance member, which support member has a plurality of second depressions on a surface facing to said second surface of the porous substance member;

at least one first electrode disposed on said first surface of the porous substance member;

at least one second electrode disposed on said second surface of the support member and on the inner surfaces of the second depressions; and means for applying a signal voltage between said first and second electrodes to move the liquid material in the porous substance member, whereby the liquid impregnation factor of the porous substance member is controlled by the movement of the liquid material in the porous substance member in response to the signal voltage to control the display of light.

106. A display device for controlling a display of light comprising:

a porous substance member having a first surface which has at least one first portion to provide a display area and a second portion to provide a non-display area, said porous substance member having a plurality of depressions in said first portion and at least one groove between said first and second portions;

liquid material impregnated in said porous substance member, said liquid material having an index of refraction substantially equal to the index of refraction of said porous substance member and having a resistivity selected to permit the operation of said display device;

at least one opaque layer disposed on said first surface while leaving said depressions uncovered;

at least one first electrode disposed on said opaque layer corresponding to at least said first portion without being disposed on inner surfaces of said groove;

at least one second electrode disposed proximate a second surface of said porous substance member spaced from said first surface; and means for applying a signal voltage between said first and second electrodes to move the liquid material in the porous substance member, whereby the liquid impregnation factor of the porous substance member is controlled by the movement of the liquid material in the porous substance member in response to the signal voltage to control the display of light and characteristics of the display is enhanced by the depressions, groove and opaque layer.

107. The display device according to claim 106 wherein said opaque layer is disposed on inner surfaces of said groove.

108. A color display device for controlling a display of light comprising:

a porous substance member having a plurality of depressions on a first surface thereof;

at least three liquid permeative coloring agents including red, green and blue deposited on inner surfaces of said depressions;

liquid material impregnated in said porous substance member, said liquid material having an index of refraction substantially equal to the index of refraction of said porous substance member and having a resistivity selected to permit the operation of said display device;

at least three first electrodes disposed on said first surface of the porous substance member corresponding to said coloring agents while leaving said depressions uncovered;

at least one second electrode disposed proximate a second surface of said porous substance member spaced from said first surface; and means for supplying at least three signal voltages between said first electrode and second electrode respectively to move the liquid material in the porous substance member, whereby the liquid impregnation factor of the porous substance member is controlled by the movement of the liquid material in the porous substance member in response to said three signal voltages to control the display of colored light.

109. A color display device for controlling a display of light comprising:

a light-transmissive porous substance member having a plurality of depressions on a first surface thereof;
at least three coloring agents including red, green and blue deposited proximate a second surface of said porous substance member corresponding to said depressions;
light transmissive liquid material impregnated in the porous substance member, said liquid material having an index of refraction substantially equal to the index of refraction of said porous substance member and having a resistivity selected to permit the operation of said display device;
at least three first electrodes disposed proximate said first surface of the porous substance member corresponding to said three coloring agents;
at least one second electrode disposed proximate said second surface of the porous substance member; and
means for supplying at least three signal voltages between said three first electrodes and second electrode respectively to move the liquid material in the porous substance member,
whereby the liquid impregnation factor of the porous substance member is controlled by the movement of the liquid material in the porous substance member in response to said three signal voltages to control the display of colored light.

110. A display device for controlling a display of light comprising:
a porous substance member;
liquid material impregnated in said porous substance member, said liquid material having an index of refraction substantially equal to the index of refraction of said porous substance member and having a resistivity selected to permit the operation of said display device;
at least one first electrode disposed proximate a surface of the porous substance member;
at least one second electrode disposed proximate a surface of the porous substance member;
a first support member for supporting said porous substance member;
a second support member disposed to be spaced from a surface of said porous substance member opposite to the surface facing said first support member;
bonding material for sealing said first and second support members at the peripherals;
liquid impregnating member disposed between said first and second support members to be in contact with said porous substance member; and
means for applying a signal voltage between said first and second electrodes to move the liquid material in the porous substance member,
whereby the liquid impregnation factor of the porous substance member is controlled by the movement of the liquid material in the porous substance member in response to the signal voltage to control the display of light.

111. The display device according to claim 110 wherein the porous substance member, first and second support members are substantially flat.

112. A substantially flat display device for controlling a display of light comprising:
a substantially flat composite body including a substantially flat porous substance member and liquid material impregnated in said porous substance member, said liquid material having an index of refraction substantially equal to the index of refraction of said porous substance member and having a resistivity selected to permit the operation of said device;
at least one first electrode disposed proximate a first surface of said composite body;
at least one second electrode disposed proximate a second surface of said composite body opposite to said first surface;
a substantially flat support member for supporting said second electrode on one surface thereof with a gap formed between said composite body and said second electrode; and
means for applying a signal voltage between said first and second electrodes to move the liquid material in the porous substance member,
whereby the liquid impregnation factor of the porous substance member is controlled by the movement of the liquid material in the porous substance member in response to the signal voltage to control the display of light and the liquid material flows into said gap upon said movement.

113. A display device for controlling a display of light comprising:
a porous substance member;
light transmissive liquid material impregnated in said porous substance member, said liquid material having an index of refraction substantially equal to the index of refraction of said porous substance member and have a resistivity selected to permit the operation of said display device;
at least one first light transmissive electrode disposed on a first surface of said porous substance member;
at least one second light transmissive electrode disposed on a second surface of said porous substance member opposite to said first surface;
at least one support member for supporting a third surface of said porous substance member; and
means for applying a signal voltage between said first and second electrodes to move the liquid material in the porous substance member,
whereby the liquid impregnation factor of the porous substance member is controlled by the movement of the liquid material in the porous substance member in response to the signal voltage to control the display of light.

114. A display device for controlling a display of light comprising:
a composite body including a light transmissive porous substance member and light transmissive liquid material impregnated in said porous substance member, said light transmissive liquid material having an index of refraction substantially equal to the index of refraction of said porous substance member and having a resistivity selected to permit the operation of said display device;
at least one first light transmissive electrode disposed proximate a surface of said composite body;
at least one second light transmissive electrode disposed proximate a surface of said composite body;
means for applying a signal voltage between said first and second electrodes to move the liquid material in the porous substance member;
a light source;
lens system for controlling light rays from said light source passing through said composite body; and
a projection screen for the display of light, whereby the liquid impregnation factor of the porous substance member is controlled by the movement of the liquid material in the porous substance member in response to the signal voltage so that light rays passing through said composite body is varied for display on the projection screen.

115. The display device according to claim 114 wherein the light source is a collimated light generator and said lens system is a Schlieren projection system which includes a lens and grating.

* * * * *